United States Patent
Oyoshi et al.

(10) Patent No.: US 11,431,873 B2
(45) Date of Patent: Aug. 30, 2022

(54) MOBILE TERMINAL CAPABLE OF SETTING COVER SHEET AND HEADER OF FAX, IMAGE FORMING APPARATUS, METHODS OF CONTROLLING MOBILE TERMINAL AND IMAGE FORMING APPARATUS, COMMUNICATION SYSTEM, AND STORAGE MEDIUM

(71) Applicant: CANON KABUSHIKI KAISHA, Tokyo (JP)

(72) Inventors: Kazuhiro Oyoshi, Tokyo (JP); Yuichi Utsumi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/502,134

(22) Filed: Jul. 3, 2019

(65) Prior Publication Data
US 2019/0327380 A1 Oct. 24, 2019

Related U.S. Application Data

(63) Continuation of application No. 14/305,704, filed on Jun. 16, 2014, now abandoned.

(30) Foreign Application Priority Data

Jun. 19, 2013 (JP) .................................. 2013-128530

(51) Int. Cl.
*H04N 1/00* (2006.01)
*H04N 1/32* (2006.01)
*H04W 12/50* (2021.01)

(52) U.S. Cl.
CPC ..... *H04N 1/32128* (2013.01); *H04N 1/00307* (2013.01); *H04N 1/32411* (2013.01);
(Continued)

(58) Field of Classification Search
None
See application file for complete search history.

(56) References Cited

U.S. PATENT DOCUMENTS 5,956,681 A    9/1999  Yamakita
8,265,694 B2 *  9/2012  Natarajan ............... H04W 4/21
                                                358/1.15
(Continued)

FOREIGN PATENT DOCUMENTS

JP    2002157240 A     5/2002
JP    2002354186    * 12/2002
(Continued)

OTHER PUBLICATIONS

Machine Translation in English of JP Pub 2014-110498 to Kida et al.*

(Continued)

*Primary Examiner* — Haris Sabah
(74) *Attorney, Agent, or Firm* — Rossi, Kimms & McDowell LLP

(57) ABSTRACT

A mobile terminal capable of setting a cover sheet and a header of a fax document and causing an image forming apparatus to transmit the fax document. Cover data representative of a cover sheet is created according to the settings of a cover sheet of a fax document, and header data representative of a header is created according to the settings of a header of the fax document. Upon receipt of an instruction for transmitting a fax document from the user, the mobile terminal transmits an instruction to the image forming apparatus for reading an original and transmitting the fax document, together with transmission destination information indicative of a transmission destination to which the fax document is to be transmitted and at least one of the cover data and the header data.

23 Claims, 16 Drawing Sheets

(52) U.S. Cl.
CPC ............... *H04N 2201/0017* (2013.01); *H04N 2201/0072* (2013.01); *H04N 2201/0075* (2013.01); *H04N 2201/0094* (2013.01); *H04N 2201/3204* (2013.01); *H04N 2201/3273* (2013.01); *H04W 12/50* (2021.01)

(56) References Cited

U.S. PATENT DOCUMENTS

| | | | |
|---|---|---|---|
| 8,964,200 | B2 | 2/2015 | Kida et al. |
| 2002/0126322 | A1 | 9/2002 | Kadowaki |
| 2002/0196478 | A1* | 12/2002 | Struble .............. G06Q 30/0601 358/474 |
| 2007/0109591 | A1 | 5/2007 | Kamens et al. |
| 2009/0086278 | A1 | 4/2009 | Vendrow et al. |
| 2010/0039661 | A1 | 2/2010 | Stephenson et al. |
| 2010/0153887 | A1* | 6/2010 | Yamaguchi ............ G06Q 10/00 715/854 |
| 2010/0214572 | A1 | 8/2010 | Sensu |
| 2010/0240394 | A1 | 9/2010 | Yamada et al. |
| 2011/0312380 | A1 | 12/2011 | Bard et al. |
| 2011/0317211 | A1* | 12/2011 | Yamada .................... G06F 9/50 358/1.15 |
| 2012/0105905 | A1* | 5/2012 | Wei ....................... G06F 3/1204 358/1.15 |
| 2013/0057908 | A1* | 3/2013 | Park .................... H04L 61/2015 358/1.15 |
| 2013/0128305 | A1 | 5/2013 | Grabkowitz et al. |
| 2013/0201515 | A1 | 8/2013 | Daos et al. |
| 2013/0201523 | A1* | 8/2013 | Oka ....................... G06F 3/1292 358/1.15 |
| 2013/0250347 | A1* | 9/2013 | Kono ................. H04N 1/00204 358/1.15 |
| 2013/0278965 | A1* | 10/2013 | Uno .................. H04N 1/32507 358/1.15 |
| 2014/0085663 | A1 | 3/2014 | Kavanappillil et al. |
| 2014/0153019 | A1* | 6/2014 | Kida ....................... G06F 3/002 358/1.13 |

FOREIGN PATENT DOCUMENTS

| | | |
|---|---|---|
| JP | 2003224687 A | 8/2003 |
| JP | 2003264650 A | 9/2003 |
| JP | 2004186959 A | 7/2004 |
| JP | 2005217648 A | 8/2005 |
| JP | 2005244566 A | 9/2005 |
| JP | 2005277794 A | 10/2005 |
| JP | 2008125114 A | 5/2008 |
| JP | 2009251836 A | 10/2009 |
| JP | 2010011357 A | 1/2010 |
| JP | 2013121053 A | 6/2013 |
| JP | 2014110498 A | 6/2014 |

OTHER PUBLICATIONS

Machine Translation in English of JP Pub 2002-354186 to Sato et al.*
Office Action issued in Japanese Appln. No. 2013-128530 dated Mar. 28, 2017.
Office Action issued in Japanese Appln. No. 2018-113682 dated Feb. 5, 2019.
Notice of Allowance issued in U.S. Appl. No. 14/305,704 dated Feb. 27, 2015.
Office Action issued in U.S. Appl. No. 14/305,704 dated Jun. 5, 2015.
Office Action issued in U.S. Appl. No. 14/305,704 dated Nov. 16, 2015.
Office Action issued in U.S. Appl. No. 14/305,704 dated Mar. 10, 2016.
Notice of Allowance issued in U.S. Appl. No. 14/305,704 dated Aug. 24, 2016.
Office Action issued in U.S. Appl. No. 14/305,704 dated Apr. 20, 2017.
Office Action issued in U.S. Appl. No. 14/305,704 dated Oct. 26, 2017.
Office Action issued in U.S. Appl. No. 14/305,704 dated May 18, 2018.
Office Action issued in U.S. Appl. No. 14/305,704 dated Apr. 5, 2019.

* cited by examiner

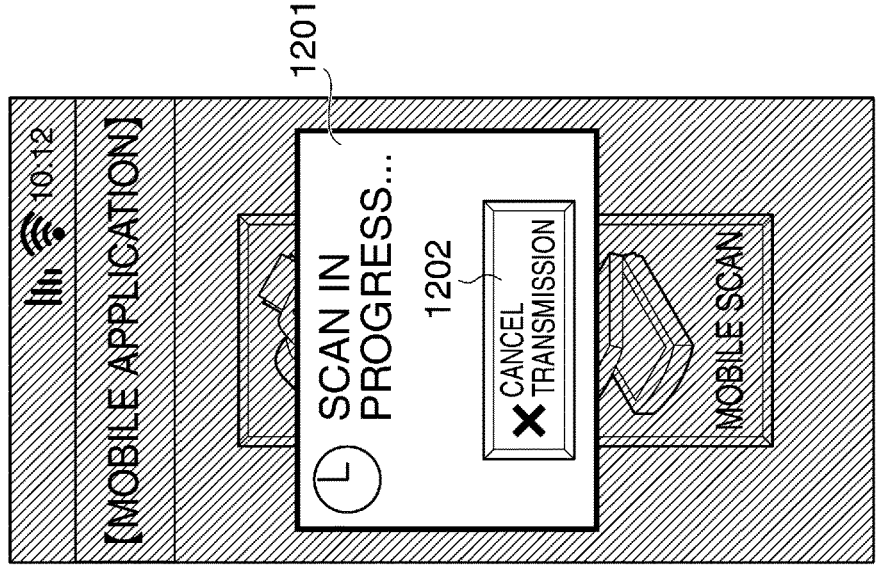
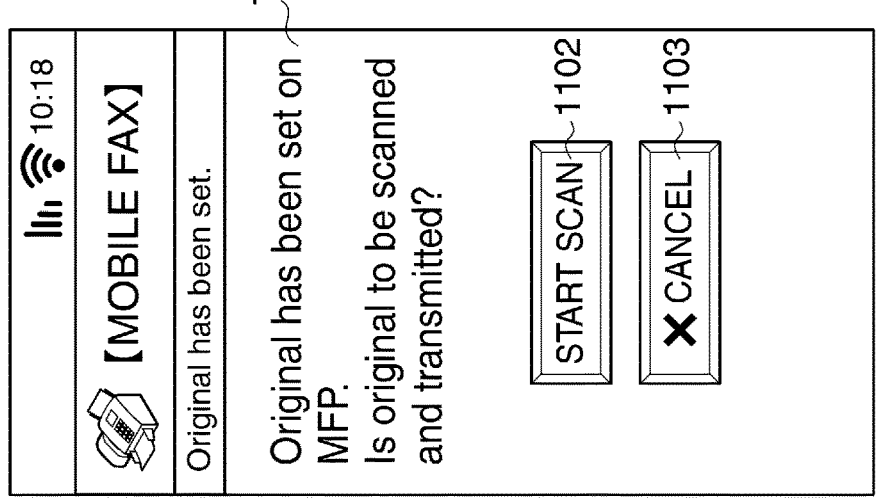
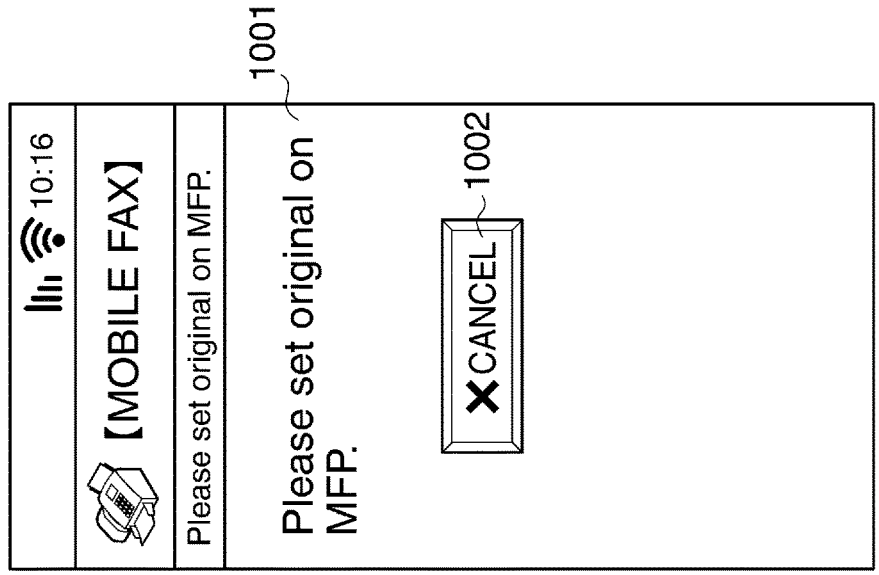

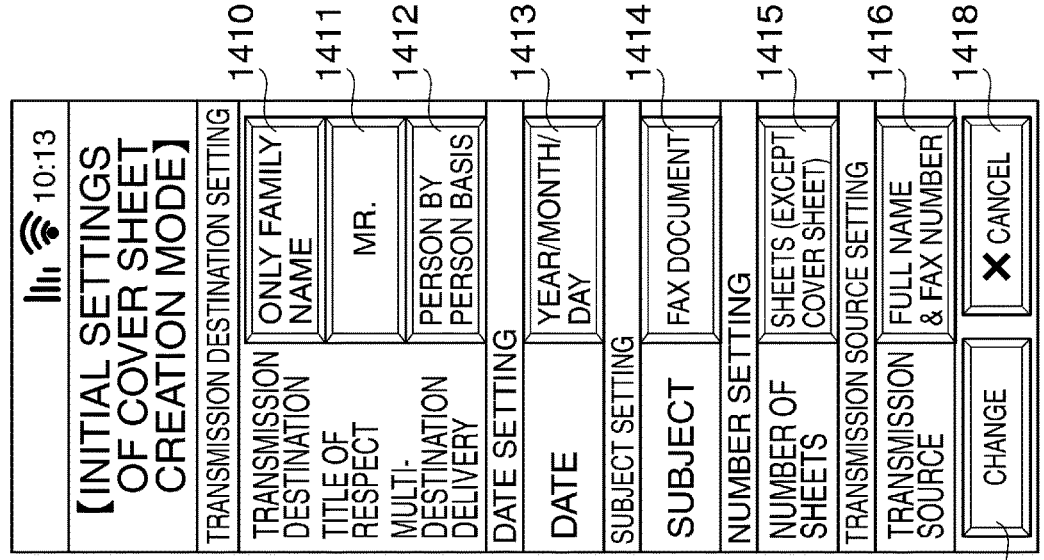
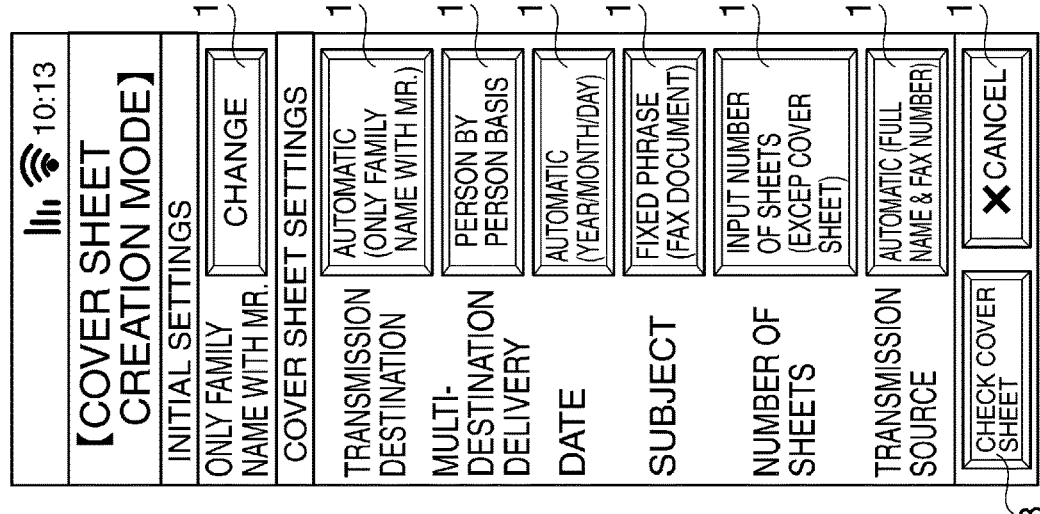
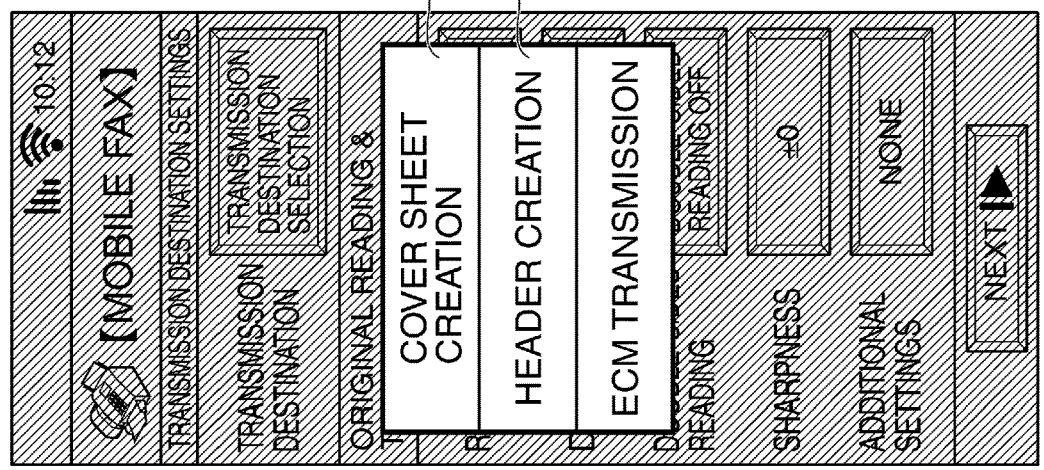

MOBILE TERMINAL CAPABLE OF SETTING COVER SHEET AND HEADER OF FAX, IMAGE FORMING APPARATUS, METHODS OF CONTROLLING MOBILE TERMINAL AND IMAGE FORMING APPARATUS, COMMUNICATION SYSTEM, AND STORAGE MEDIUM

BACKGROUND OF THE INVENTION

Field of the Invention

The present invention relates to a mobile terminal that is capable of setting a cover sheet and a header of a fax document, an image forming apparatus, methods of controlling the mobile terminal and the image forming apparatus, a communication system, and a storage medium.

Description of the Related Art

In recent years, as one of mobile terminals, a device called a smartphone with an excellent operability has come into widespread use. The smartphone incorporates a telephone directory, in which a plurality of information items, such as a home phone number, a mobile phone number, and a company's fax number, can be registered with respect to each person's name. Further, information of a user himself/herself as profile information can be also registered in plurality, similarly to transmission destination information.

On the other hand, an image forming apparatus as an MFP (multifunction peripheral) with a function of image formation has a function of transmitting a fax document to which information of a transmission source is added as header information, and a function of causing another fax machine registered in advance as a proxy fax machine to transmit a fax document on its behalf (hereinafter referred to as "execute proxy transmission") when the fax function of its own is not available because a fax document is being transmitted or received when the user intends to transmit the fax document.

There has been proposed a fax transmission system configured such that for proxy transmission of a fax document, not only fax document data, but also a fax number, a name, etc. as data of a transmission source, are transmitted to a proxy fax machine, and the proxy fax machine performs fax transmission on behalf of a fax machine requesting the proxy transmission (see e.g. Japanese Patent Laid-Open Publication No. 2004-186959).

Further, there has been proposed an image forming apparatus having a function of performing fax transmission after attaching a cover sheet to a document to be faxed according to an instruction input by a user operation from a console section of the image forming apparatus (see e.g. Japanese Patent Laid-Open Publication No. 2003-264650).

However, in the above-described conventional techniques, information added to a fax document as a header is information on the image forming apparatus as a transmission source, and hence there is a problem that although information on the image forming apparatus can be obtained, information on the user cannot be obtained.

Further, when adding information on a user, the user is required to manually input the information from the console section of the image forming apparatus, and hence there are problems that time and efforts are required and that the user may make an input error.

SUMMARY OF THE INVENTION

The present invention provides a mobile terminal capable of setting a cover sheet and a header of a fax document and causing an image forming apparatus to transmit the fax document, an image forming apparatus, methods of controlling the mobile terminal and the image forming apparatus, a storage medium, and a communication system.

In a first aspect of the present invention, there is provided a mobile terminal that is capable of communicating with an image forming apparatus, comprising a transmission destination setting unit configured to set transmission destination information indicative of a transmission destination to which a fax document is to be transmitted, a cover sheet creation unit configured to create, according to settings of a cover sheet of the fax document, cover sheet data representative of the cover sheet, a header creation unit configured to create, according to settings of a header of the fax document, header data representative of the header, a request transmission unit configured to transmit a request for transmitting the fax document, to the image forming apparatus, an original setting instruction-displaying unit configured to display a message for prompting a user to set an original on the image forming apparatus when a response notifying that the image forming apparatus is capable of transmitting a fax document is received from the image forming apparatus to which the request has been transmitted by the request transmission unit, an instruction transmission unit configured to transmit, when it is detected that the original has been set on the image forming apparatus, and an instruction for transmitting a fax document is received from the user, an instruction for reading the original and transmitting the fax document, together with the transmission destination information set by the transmission destination setting unit, and at least one of the cover sheet data created by the cover sheet creation unit and the header data created by the header creation unit, to the image forming apparatus, and a transmission result-displaying unit configured to display a result of transmission of the fax document by the image forming apparatus, which is instructed by the instruction transmission unit, on the display section.

In a second aspect of the present invention, there is provided an image forming apparatus that is capable of communicating with a mobile terminal, comprising a request reception unit configured to receive a request for transmitting a fax document, from the mobile terminal, a response unit configured to transmit a response notifying that the image forming apparatus is capable of transmitting the fax document, to the mobile terminal, an instruction reception unit configured to receive from the mobile terminal an instruction for reading an original and transmitting the fax document, together with transmission destination information indicative of a transmission destination to which the fax document is to be transmitted and at least one of cover sheet data and header data of the fax document, a fax document transmission unit configured to read the original, and transmit the fax document representing the original to the transmission destination indicated by the transmission destination information, together with data generated based on at least one the cover sheet data and the header data, according to the instruction for reading the original and transmitting the fax document, received by the instruction reception unit, and a status setting unit configured to set a status indicative of a result of transmission of the fax document by the fax document transmission unit.

In a third aspect of the present invention, there is provided a communication system including a mobile terminal and an image forming apparatus, in which the mobile terminal and the image forming apparatus can communicate with each other, wherein the mobile terminal comprises a transmission destination setting unit configured to set transmission destination information indicative of a transmission destination to which a fax document is to be transmitted, a cover sheet creation unit configured to create, according to settings of a cover sheet of the fax document, cover sheet data representative of the cover sheet, a header creation unit configured to create, according to settings of a header of the fax document, header data representative of the header, a request transmission unit configured to transmit a request for transmitting the fax document, to the image forming apparatus, an original setting instruction-displaying unit configured to display a message for prompting a user to set an original on the image forming apparatus when a response notifying that the image forming apparatus is capable of transmitting a fax document is received from the image forming apparatus to which the request has been transmitted by the request transmission unit, an instruction transmission unit configured to transmit, when it is detected that the original has been set on the image forming apparatus, and an instruction for transmitting a fax document is received from the user, an instruction for reading the original and transmitting the fax document, together with the transmission destination information set by the transmission destination setting unit, and at least one of the cover sheet data created by the cover sheet creation unit and the header data created by the header creation unit, to the image forming apparatus, and a transmission result-displaying unit configured to display a result of transmission of the fax document by the image forming apparatus, which is instructed by the instruction transmission unit, on the display section, and wherein the image forming apparatus comprises a request reception unit configured to receive the request for transmitting the fax document, from the mobile terminal, a response unit configured to transmit a response notifying that the image forming apparatus is capable of transmitting the fax document, to the mobile terminal, an instruction reception unit configured to receive from the mobile terminal the instruction for reading the original and transmitting the fax document, together with the transmission destination information and at least one of the cover sheet data and the header data, a fax document transmission unit configured to read the original, and transmit the fax document representing the original to the transmission destination indicated by the transmission destination information, together with data generated based on at least one of the cover sheet data and the header data, according to the instruction for reading the original and transmitting the fax document, received by the instruction reception unit, and a status setting unit configured to set a status indicative of a result of transmission of the fax document by the fax document transmission unit.

In a fourth aspect of the present invention, there is provided a method of controlling a mobile terminal that is capable of communicating with an image forming apparatus, comprising setting transmission destination information indicative of a transmission destination to which a fax document is to be transmitted, creating, according to settings of a cover sheet of the fax document, cover sheet data representative of the cover sheet, creating, according to settings of a header of the fax document, header data representative of the header, transmitting a request for transmitting the fax document, to the image forming apparatus, displaying a message for prompting a user to set an original on the image forming apparatus when a response notifying that the image forming apparatus is capable of transmitting a fax document is received from the image forming apparatus to which the request has been transmitted by said transmitting, transmitting, when it is detected that the original has been set on the image forming apparatus, and an instruction for transmitting a fax document is received from the user, an instruction for reading the original and transmitting the fax document, together with the transmission destination information set by said setting, and at least one of the cover sheet data created by said first-mentioned creating and the header data created by said second-mentioned creating, to the image forming apparatus, and displaying a result of transmission of the fax document by the image forming apparatus, which is instructed by said transmitting, on the display section.

In a fifth aspect of the present invention, there is provided a method of controlling an image forming apparatus that is capable of communicating with a mobile terminal, comprising receiving a request for transmitting a fax document, from the mobile terminal, transmitting a response notifying that the image forming apparatus is capable of transmitting the fax document, to the mobile terminal, receiving from the mobile terminal an instruction for reading an original and transmitting the fax document, together with transmission destination information indicative of a transmission destination to which the fax document is to be transmitted and at least one of cover sheet data and header data of the fax document, reading the original, and transmitting the fax document representing the original to the transmission destination indicated by the transmission destination information, together with data generated based on at least one the cover sheet data and the header data, according to the instruction for reading the original and transmitting the fax document, received by said receiving, and setting a status indicative of a result of transmission of the fax document by said transmitting.

In a sixth aspect of the present invention, there is provided a non-transitory computer-readable storage medium storing a computer-executable program for executing a method of controlling a mobile terminal that is capable of communicating with an image forming apparatus, wherein the method comprises setting transmission destination information indicative of a transmission destination to which a fax document is to be transmitted, creating, according to settings of a cover sheet of the fax document, cover sheet data representative of the cover sheet, creating, according to settings of a header of the fax document, header data representative of the header, transmitting a request for transmitting the fax document, to the image forming apparatus, displaying a message for prompting a user to set an original on the image forming apparatus when a response notifying that the image forming apparatus is capable of transmitting a fax document is received from the image forming apparatus to which the request has been transmitted by said transmitting, transmitting, when it is detected that the original has been set on the image forming apparatus, and an instruction for transmitting a fax document is received from the user, an instruction for reading the original and transmitting the fax document, together with the transmission destination information set by said setting, and at least one of the cover sheet data created by said first-mentioned creating and the header data created by said second-mentioned creating, to the image forming apparatus, and displaying a result of transmission of the fax document by the image forming apparatus, which is instructed by said transmitting, on the display section.

In a seventh aspect of the present invention, there is provided a non-transitory computer-readable storage medium storing a computer-executable program for executing a method of controlling an image forming apparatus that is capable of communicating with a mobile terminal, wherein the method comprises receiving a request for transmitting a fax document, from the mobile terminal, transmitting a response notifying that the image forming apparatus is capable of transmitting the fax document, to the mobile terminal, receiving from the mobile terminal an instruction for reading an original and transmitting the fax document, together with transmission destination information indicative of a transmission destination to which the fax document is to be transmitted and at least one of cover sheet data and header data of the fax document, reading the original, and transmitting the fax document representing the original to the transmission destination indicated by the transmission destination information, together with data generated based on at least one the cover sheet data and the header data, according to the instruction for reading the original and transmitting the fax document, received by said receiving, and setting a status indicative of a result of transmission of the fax document by said transmitting.

According to the present invention, cover data representative of a cover sheet is created according to settings concerning the cover sheet of a fax document, and header data representative of a header is created according to the settings concerning the header of the fax. Upon receipt of an instruction for transmitting a fax document from the user, the mobile terminal transmits, to the image forming apparatus, an instruction for reading an original and transmitting the fax document, together with transmission destination information and at least one of the cover data and header data. This makes it possible to cause the image forming apparatus to transmit the fax document with the cover sheet and/or header set using the mobile terminal.

Further features of the present invention will become apparent from the following description of exemplary embodiments (with reference to the attached drawings).

BRIEF DESCRIPTION OF THE DRAWINGS

FIGS. 4A to 4C are diagrams showing examples of screens of the mobile terminal appearing in FIG. 1.

FIGS. 6A to 6C are diagrams showing examples of screens displayed by the mobile fax application.

FIGS. 7A to 7C are diagrams showing examples of screens displayed by the mobile fax application.

DESCRIPTION OF THE EMBODIMENTS

The present invention will now be described in detail below with reference to the accompanying drawings showing embodiments thereof.

Figure 1:
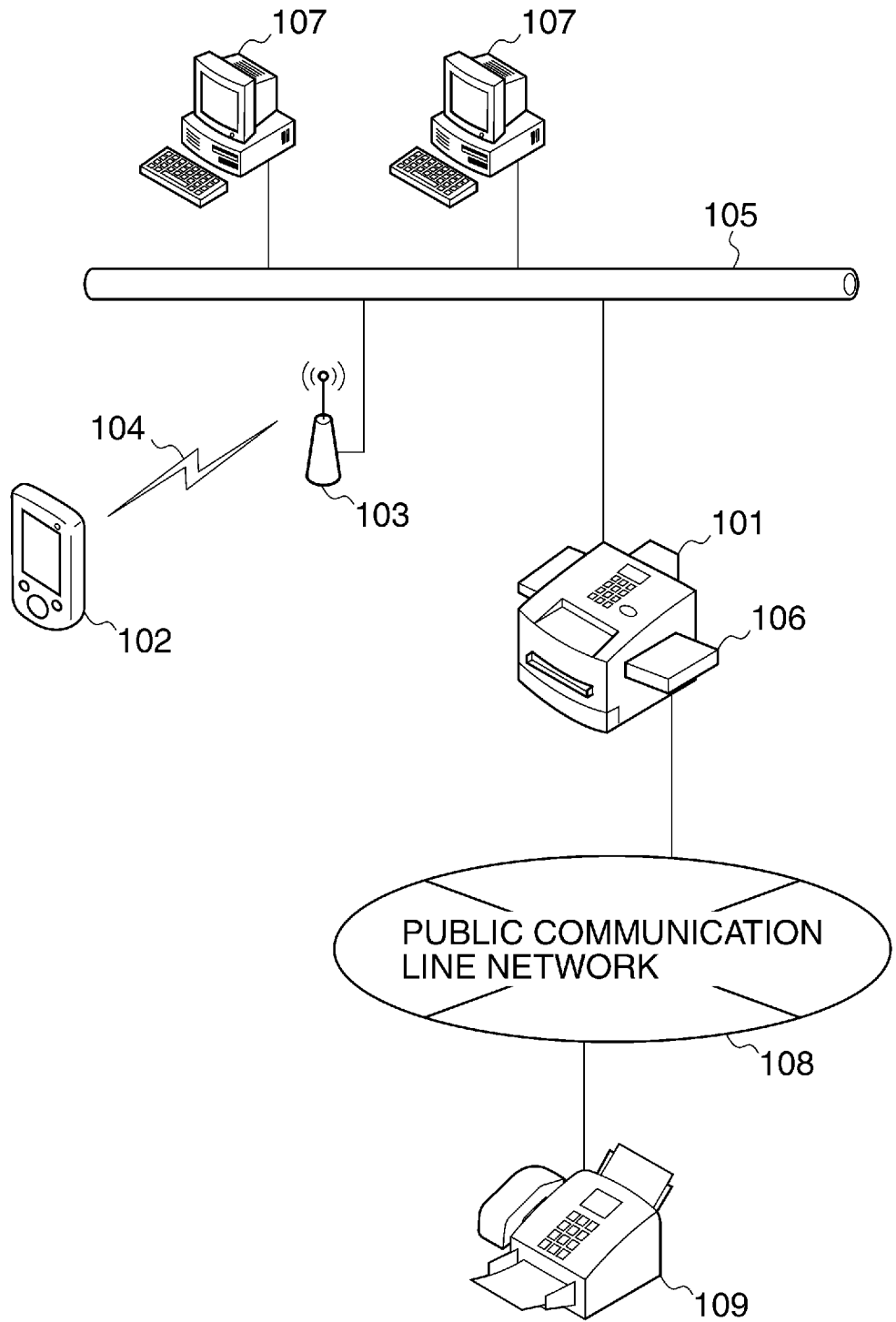
FIG. 1 is a schematic diagram of a communication system according to an embodiment of the present invention.

FIG. 1 is a schematic diagram of a communication system 100 according to an embodiment of the present invention.

Referring to FIG. 1, the communication system 100 comprises an MFP (multifunction peripheral) 101, a mobile terminal 102, and PCs (personal computers) 107, which are connected via a network (wired LAN) 105. The mobile terminal 102 is connected to the network 105 by a wireless LAN 104 via an access point 103 provided on the network 105.

Further, the MFP 101 is provided with an NFC (near field communication) tag 106, which makes it possible to communicate with an NFC function-equipped device. Further, the MFP 101 has an interface with a public communication line network 108, which makes it possible to perform fax transmission and reception to and from a facsimile machine 109 connected via the public communication line network 108.

In the present embodiment, the MFP 101 and the mobile terminal 102 can communicate with each other via the wireless LAN 104 and the network 105, and operate in cooperation with each other.

Although in FIG. 1, the MFP 101 is connected to the network 105 via wired connection, the MFP 101 may be wirelessly connected to the network 105. In this case, the MFP 101 is connected to the network 105 via the access point 103.

Figure 2:
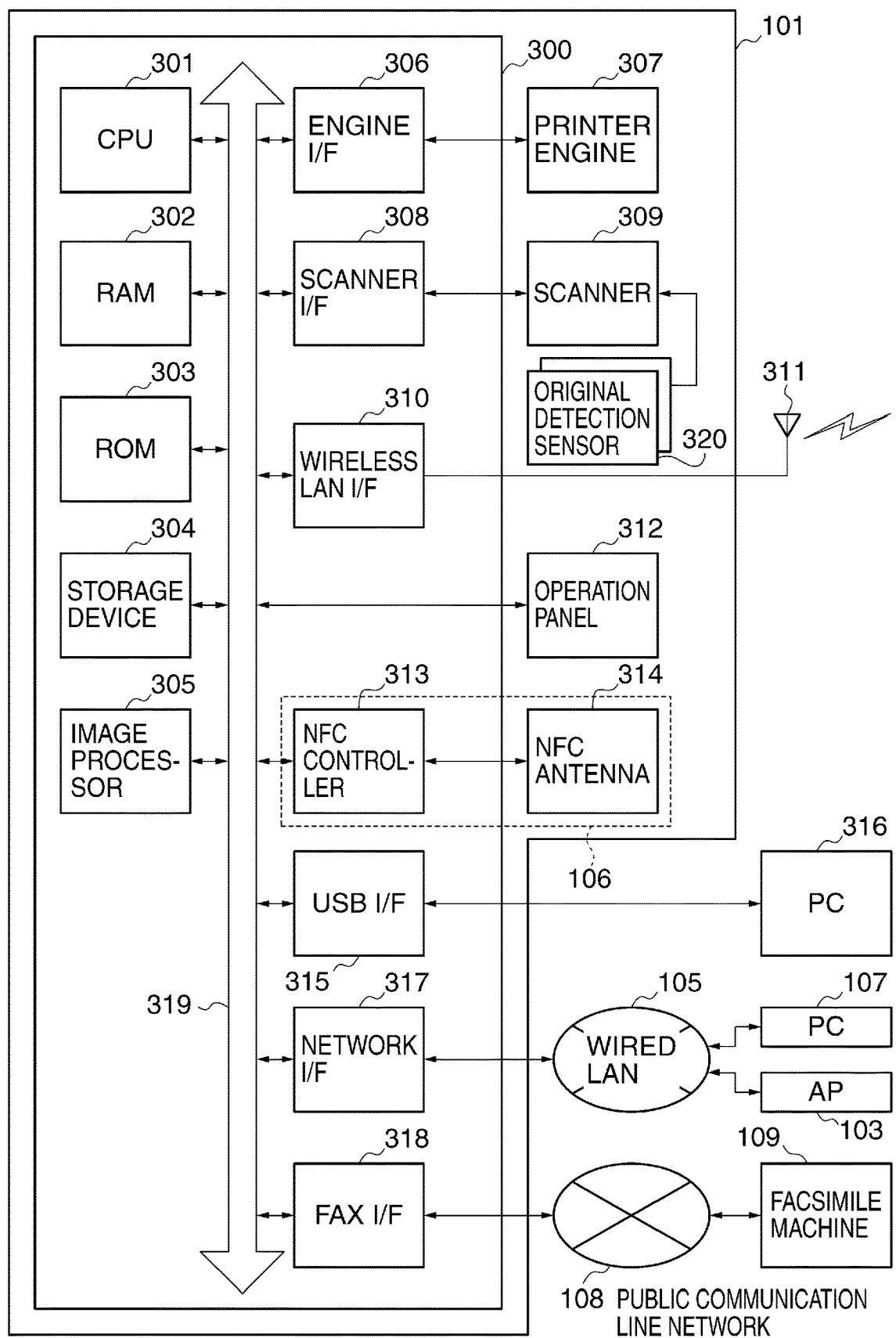
FIG. 2 is a schematic block diagram of an MFP appearing in FIG. 1.

FIG. 2 is a schematic block diagram of the MFP 101 appearing in FIG. 1.

Referring to FIG. 2, the MFP 101 comprises a controller board 300, a scanner 309, a printer engine 307, a console panel 312, and an NFC antenna 314.

Of these, the scanner 309 reads an original, the printer engine 307 prints print data on a sheet, and the console panel 312 receives inputs of various setting operations and displays an alarm etc.

Further, an original detection sensor 320 for detecting an original is connected to the scanner 309. The original detection sensor 320 includes a platen part and an ADF (automatic document feeder) part.

In the case of the platen part of the original detection sensor 320, when an original is placed on an original platen glass, not shown, of the scanner 309, it detects the placed original, and notifies the scanner 309 of the detection result. In the case of the ADF part of the original detection sensor 320, when an original is placed on a document feeder, not shown of the scanner 309, it detects the placed original, and notifies the scanner 309 of the detection result.

A CPU 301 of the controller board 300 controls the overall operation of the MFP 101. A ROM 303 is a boot ROM storing a boot program of the MFP 101.

A RAM 302 is a system work memory used for operation of the CPU 301, which stores calculation data calculated by the CPU 301 and various programs executed by the same. Further, the RAM 302 is also used as an image memory for storing image data on which various image processing has been performed by an image processor 305 during printing or the like.

A storage device 304 is a non-volatile secondary storage device for storing large-sized programs and data, and the stored large-sized programs and data are used by being loaded into the RAM 302.

A scanner interface 308 is an interface for performing data communication with the scanner 309. An engine interface 306 is an interface for performing data communication with the printer engine 307.

A fax interface 318 is connected to the public communication line network 108 via a modular jack, not shown, and performs fax transmission and reception to and from the facsimile machine 109.

A network interface 317 is connected to the network 105 via a LAN interface connector, and performs network communication with the PCs 107 and the mobile terminal 102. In a case where the MFP 101 is wirelessly connected as mentioned above, a wireless LAN interface 310 performs network communication with the PCs 107, the access point 103, and the mobile terminal 102 via a wireless LAN antenna 311.

A USB interface 315 performs USB communication with other devices via a USB connector, not shown. In FIG. 2, the USB interface 315 is locally connected to a PC 316.

An NFC controller 313 performs NFC communication with a mobile terminal equipped with the NFC function via the NFC antenna 314.

The above-described sections and console panel 312 of the controller board 300 are connected to each other via a bus 319.

Figure 3:
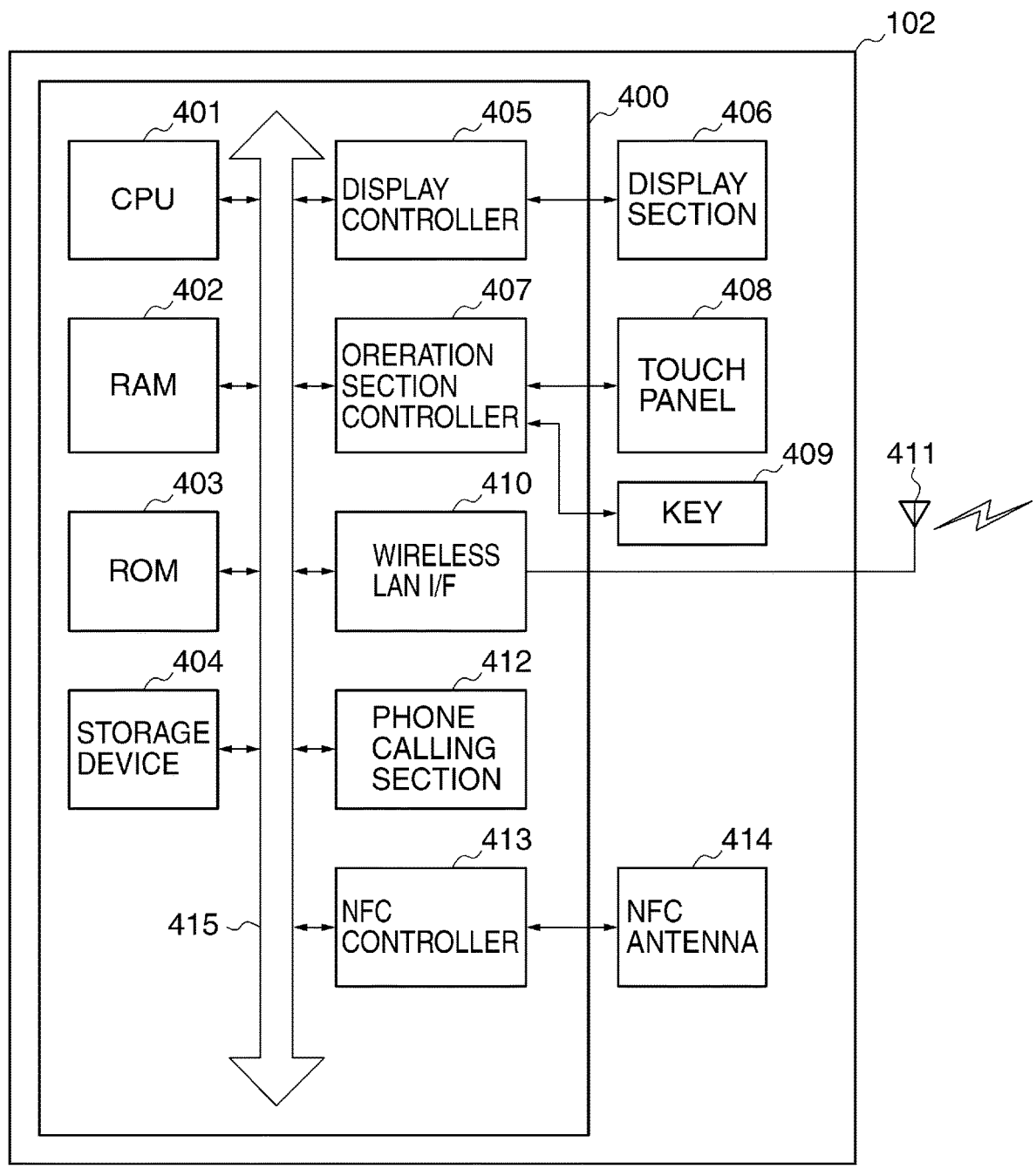
FIG. 3 is a schematic block diagram of a mobile terminal appearing in FIG. 1.

FIG. 3 is a schematic block diagram of the mobile terminal 102 appearing in FIG. 1.

Referring to FIG. 3, the mobile terminal 102 comprises a controller board 400, a display section 406, a touch panel 408, keys 409, and an NFC antenna 414.

Various information is displayed on the display section 406 by a display controller 405, and an operation section controller 407 performs various control with respect to the touch panel 408 and the keys 409. A user can give instructions for menu scroll and button pressing, with respect to menus and buttons displayed on the display section 406, by sliding and touching the touch panel 408 with his/her finger.

A CPU 401 of the controller board 400 controls the overall operation of the mobile terminal 102. A ROM 403 is a boot ROM storing a boot program of the mobile terminal 102.

A RAM 402 is a system work memory used for operation of the CPU 401, which stores calculation data calculated by the CPU 401 and various programs executed by the same. A storage device 404 is a non-volatile secondary storage device for storing large-sized programs and data, and the stored large-sized programs and data are used by being loaded into the RAM 402.

A wireless LAN interface 410 is connected to the access point 103 by wireless LAN via a wireless LAN antenna 411 to perform wireless LAN communication with external devices. A phone calling section 412 is connected to a microphone and a speaker, neither of which is shown, and is connected to the public communication line to provide a function as a telephone. An NFC controller 413 performs NFC communication with a device equipped with the NFC function via the NFC antenna 414.

The above-described sections of the controller board 400 are connected to each other via a bus 415.

Although in the present embodiment, a smartphone is described as an example of the mobile terminal 102, this is not limitative, but the present embodiment can also be applied to a terminal for mobile use, such as a tablet PC, in which the phone calling section 412 is excluded from the above-described configuration.

FIGS. 4A to 4C are diagrams showing examples of screens of the mobile terminal 102 appearing in FIG. 1.

FIG. 4A shows a screen of a contact list of a telephone directory application. Information of a telephone number, a mobile telephone number, a fax number, an e-mail address, and so forth can be registered, on a registered name-by-registered name basis, in the telephone directory application.

Referring to FIG. 4A, a contact list screen 501 is formed by a search input box 502 and a registered name-displaying section 503, such that the user can search for a registered name, and select a registered name from the displayed list. When a registered name is selected, contacts registered in association with the selected registered name are displayed as a list.

FIG. 4B shows an example of a displayed list of contacts (contact list). Referring to FIG. 4B, a registered name 601 indicates Takahashi Taro, and in association with this registered name, a telephone number 602, a mobile phone number 603, a fax number 604, an e-mail address 605 of the mobile phone, and an e-mail address 606 of a company are registered.

The user can select a contact from these items. When the user selects the fax number 604, a mobile fax application is started, which makes it possible to perform fax transmission in cooperation with the MFP 101.

FIG. 4C shows a top screen of an MFP cooperation application.

The top screen shown in FIG. 4C displays a mobile fax button 701 and a mobile scan button 702.

In the present embodiment, the mobile fax application in which the mobile terminal 102 and the MFP 101 perform fax transmission in cooperation with each other will be described.

FIGS. 5A to 8D are diagrams showing examples of screens displayed by the mobile fax application.

Figure 5A:
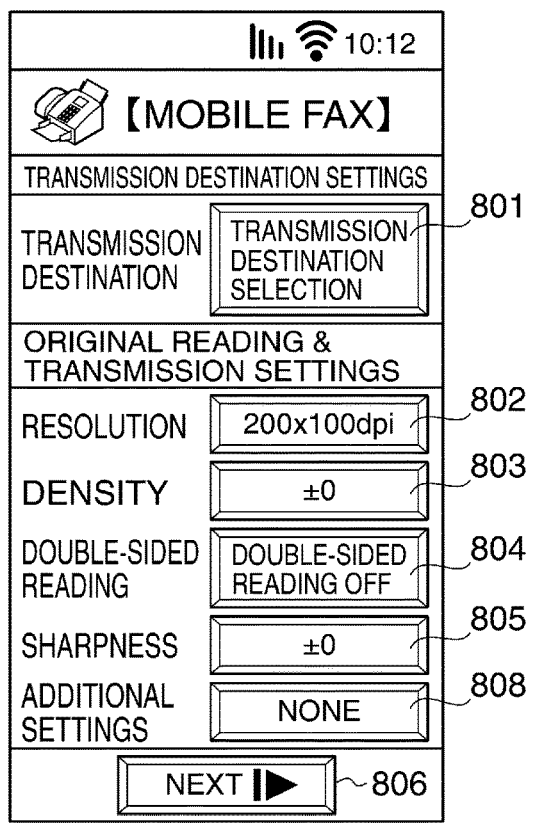
FIGS. 5A to 5D are diagrams showing examples of screens displayed by a mobile fax application.

When the user presses the mobile fax button 701 on the screen shown in FIG. 4C, a setting screen of the mobile fax application shown in FIG. 5A is displayed.

This setting screen displays items which can be set, such as a transmission destination, and each item can be set by an operation on the touch panel.

More specifically, a transmission destination selection button 801, a resolution setting button 802, a density setting button 803, a double-sided reading setting button 804, a sharpness setting button 805, and an additional setting button 808 are displayed.

Figure 5B:
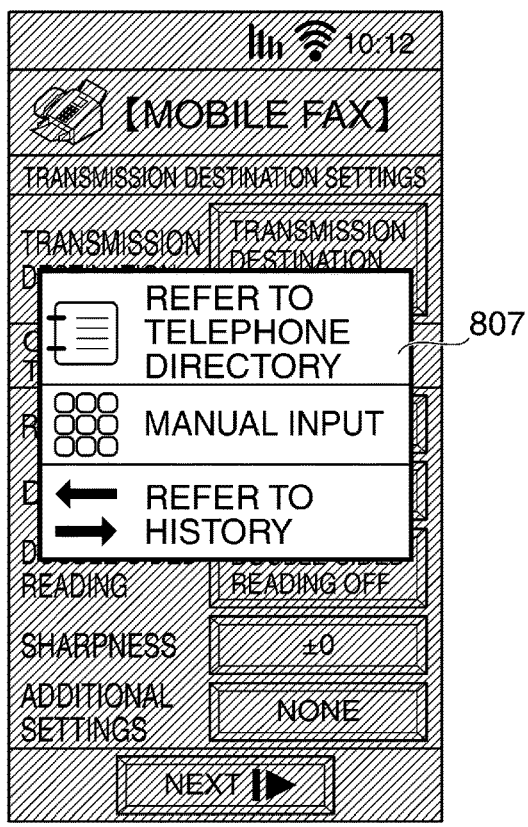

Of these, when the transmission destination selection button 801 is pressed, a transmission destination setting method selection screen shown in FIG. 5B is displayed, and this is a screen for prompting the user to select a transmission destination setting method. When the user selects a telephone directory reference button 807 on this screen, the user can select a transmission destination on the screen of the telephone directory application, shown in FIG. 4A. Further, the user can also manually set a number, or select a transmission destination by referring to history of transmission destination records.

Referring again to FIG. 5A, a candidate of resolution is displayed on the resolution setting button 802. If the user desires to change the resolution, by pressing the resolution setting button 802, the screen is changed to a screen including other candidates, and the user can select a desired resolution out of the displayed candidates.

When the user does not intend to change the resolution, the resolution is set to a setting of 200×100 dpi displayed on the resolution setting button 802. When the setting of the resolution has been changed, the changed setting is displayed on the resolution setting button 802, and the resolution is set to this setting.

The settings displayed on the density setting button 803, the double-sided reading setting button 804, and the sharpness setting button 805 can also be changed by the same operation as that of the resolution setting button 802. A case where the additional setting button 808 is pressed will be described hereinafter.

Figure 5C:
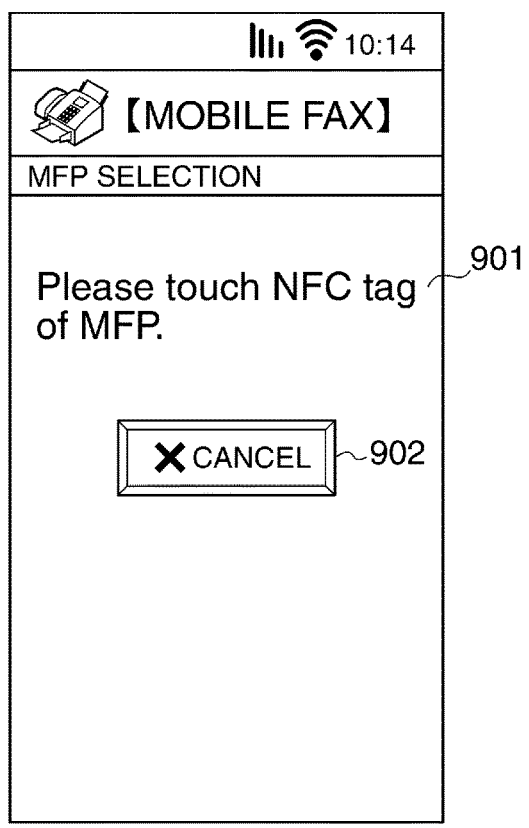

When a next button 806 is pressed, the setting items are set, and a screen shown in FIG. 5C is displayed.

FIG. 5C shows an MFP selection screen. This screen displays a display 901 of a message that prompts the user to proceed to next processing, and a cancel button 902 for canceling the processing.

Figure 5D:
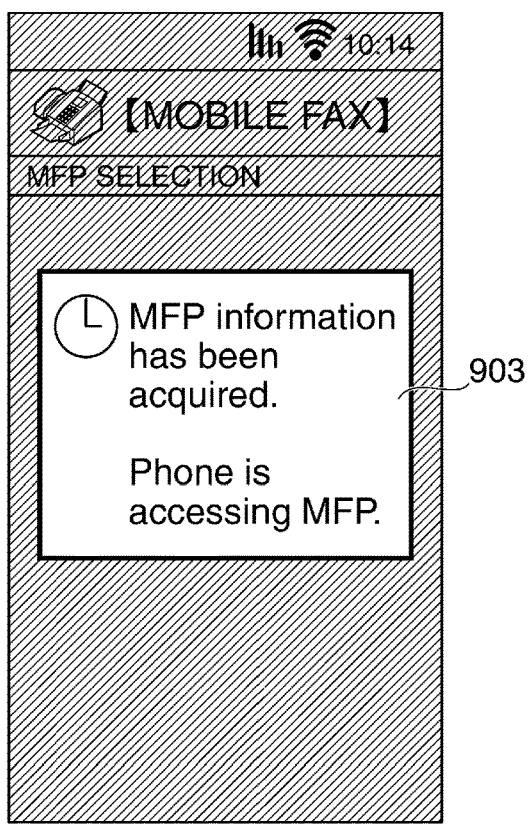

When the user touches the mobile terminal 102 against the NFC tag 106 of the MFP 101 to proceed to the next processing, a screen shown in FIG. 5D is displayed.

FIG. 5D shows an alarm display screen. This screen indicates that the MFP 101 and the mobile terminal 102 are performing preparations for cooperation.

Next, when the MFP 101 and the mobile terminal 102 are ready for cooperation, a screen shown in FIG. 6A is displayed.

FIG. 6A shows an original setting instruction screen. This is a screen for prompting the user to set an original. This screen displays a display 1001 of a message that prompts the user to proceed to next processing, and a cancel button 1002 for canceling the processing.

When an original is set on the MFP 101, a screen shown in FIG. 6B is displayed.

FIG. 6B shows a scan start instruction screen for accepting a scan start instruction by the user. This screen displays a display 1101 of a message that prompts the user to proceed to next processing, a scan start button 1102 for instructing the start of scan, and a cancel button 1103 for canceling the processing.

When the scan start button 1102 is pressed on this screen, a screen shown in FIG. 6C is displayed.

FIG. 6C shows a screen displaying the status of the MFP 101. This screen displays a display 1201 of a message indicative of the status of the MFP 101, and a transmission cancel button 1202 for instructing the MFP 101 to cancel transmission.

Referring again to FIG. 5A, when the additional setting button 808 is pressed, a screen shown in FIG. 7A is displayed. The screen shown in FIG. 7A displays items each of which can be set as an additional setting. In this example, cover sheet creation, header creation, and ECM (error correction mode) transmission can be set.

When the user selects a cover sheet creation button 809, a screen shown in FIG. 7B is displayed. The screen shown in FIG. 7B displays settings of a cover sheet creation mode. This screen enables the user to configure cover sheet creation.

Figure 8A:
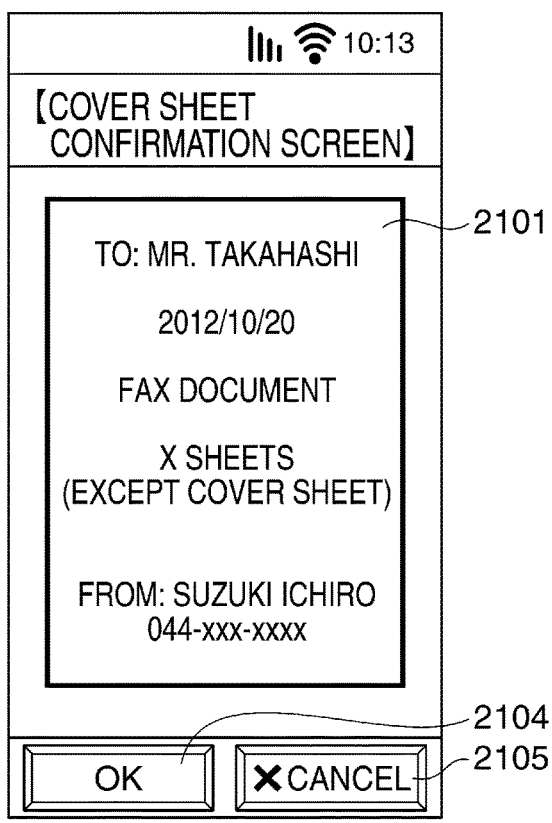
FIGS. 8A to 8D are diagrams showing examples of screens displayed by the mobile fax application.
Figure 8B:
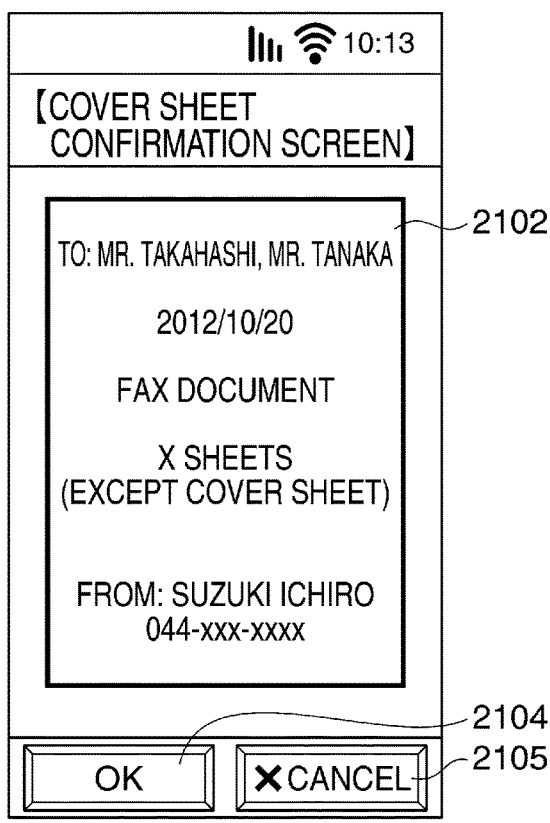
Figure 8C:
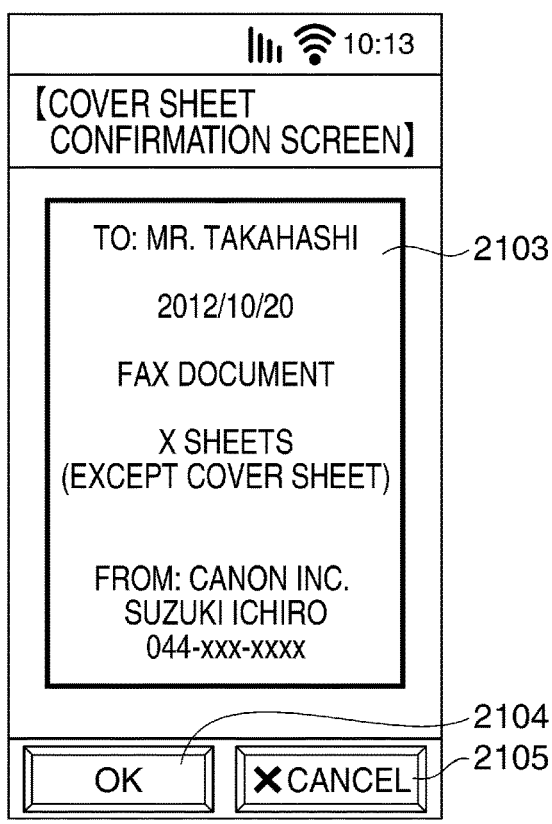
Figure 8D:
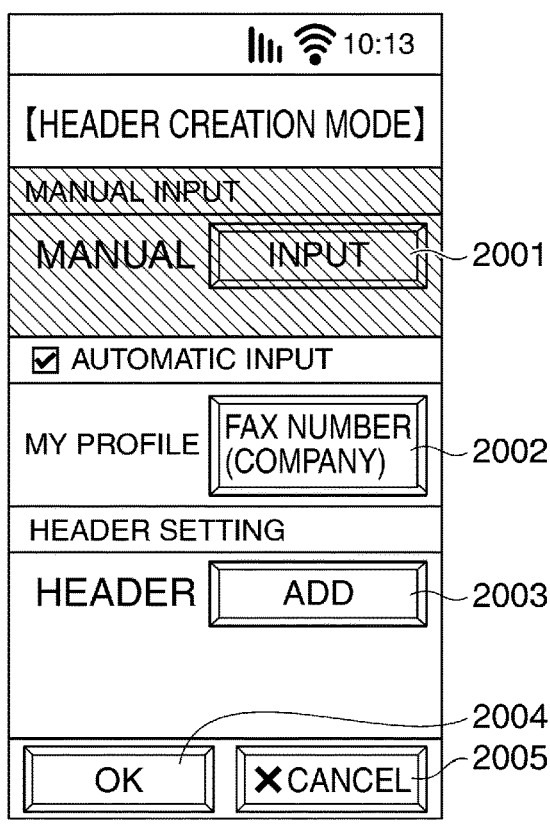

On the other hand, when the user selects a header creation button 810 on the screen shown in FIG. 7A, a screen shown in FIG. 8D is displayed. The screen shown in FIG. 8D displays settings of a header creation mode. This screen enables the user to configure header creation. Details of the screen showing the settings of the header creation mode in FIG. 8D will be described hereinafter.

Further, by selecting an ECM transmission button on the screen shown in FIG. 7A, the user can select whether or not to use ECM transmission.

The screen shown in FIG. 7B will be described. As mentioned above, the screen shown in FIG. 7B displays the settings of the cover sheet creation mode, and in this example, the user can view a list of settings set by initialization.

When a button 1401 is pressed, a screen shown in FIG. 7C is displayed. The screen shown in FIG. 7C is used for initialization of the settings. On this screen, the user can set items of a transmission destination, a date, a subject, the number of sheets, and a transmission source, as the initial settings.

For the setting of a transmission destination, the user can select which item of information registered in the telephone directory of the mobile terminal 102 is to be used, by a button 1410. More specifically, the user can select one of "only family name", "full name", "combination of name and division", and so on.

For the setting of a title of respect, the user can select one of "Mr.", "Ms.", etc., by a button 1411. For the setting of multi-transmission destination delivery, since fax transmission is to be performed to a plurality of transmission destinations, the user can select whether a transmission destination name of only an individual is to be set on an individual-by-individual basis, or a plurality of transmission destination names are to be set as joint names, by a button 1412.

For the setting of a date, the user can select a date format pattern by a button 1413. For the setting of a subject, the user can perform manual input or select a fixed phrase by a button 1414, and in this example, "Fax Document" is set as an example of the fixed phrase.

For the setting of the number of sheets, the user can select one of fixed phrases by a button 1415, and in this example, "sheets (except cover sheet)" is set as an example of the fixed phrase. For the setting of a transmission source, the user can select which item of information registered in the telephone directory of the mobile terminal 102 is to be used, by a button 1416.

In the telephone directory of the mobile terminal 102, information on the user of the mobile terminal 102 can be registered as "my profile", and in this example, the information registered in "my profile" is referred to and used as the transmission source information.

For the setting of transmission source information, a name and a contact can be registered. For the name of these, the user can select which of only a name and a combination of a name and a division to which the user belongs. Further, the contact of the same, the user can select which fax number is to be used.

Further, for the contact, not only a fax number but also a phone number or an e-mail address may be allowed to be used. Further, although the initial settings of the cover sheet creation mode have been described according to one template in this example, it is also possible to apply the initial settings to various types of templates, e.g. one using another language as the language of use.

When a button 1417 is pressed, the CPU 401 changes the settings according to the contents displayed on the screen, and causes the screen to return to the screen of the cover sheet creation mode. When the button 1418 is pressed, the CPU 401 causes the screen to return to the screen of the cover sheet creation mode without changing the settings. As described above, the settings of the cover sheet of a fax document are the settings of a transmission destination, a title of respect, multi-transmission destination delivery, a date, a subject, the number of sheets, and a transmission source, which are to be written on the cover sheet of the fax document. Note that these settings are enumerated only as an example, and the configuration may be such that at least one of the settings of the above example can be set or that settings not included in the above example can also be set.

Referring again to FIG. 7B, buttons 1402 to 1407 are used for changing the settings of respective setting items of the cover sheet, and the settings made by initialization can be confirmed by information displayed on these buttons. Further, when a button 1409 is pressed, cover sheet creation is canceled.

For example, when the button 1406 for setting the number of sheets is pressed, the screen is changed to a screen for manually inputting the number of sheets, and the user can input and set the number of sheets.

For each of the other items, the user can also manually set values and can freely create a cover sheet from this screen.

When a button 1408 is pressed, cover sheet data is created according to the settings of the cover sheet mode, and a cover sheet confirmation screen shown in FIGS. 8A, 8B, and 8C is displayed.

FIGS. 8A, 8B, and 8C are examples of the cover sheet confirmation screen which displays the cover sheet created according to the settings of the cover sheet mode as a preview. In these examples, previews indicated by 2101, 2102, and 2103 are displayed, respectively.

The preview 2101 in FIG. 8A is an example of the display formed according to the settings shown in FIG. 7B. Further, the preview 2102 in FIG. 8B is an example of the display formed in a case where the setting of multiple-transmission destination delivery is changed to the joint names. Furthermore, the preview 2103 in FIG. 8C is an example of the display formed in a case where the information of a division to which the user belongs, which is registered in "my profile", is combined with the transmission source information.

In FIGS. 8A, 8B, and 8C, when a button 2104 is pressed, the cover sheet is created. In FIGS. 8A, 8B, and 8C, when a button 2105 is pressed, the screen is returned to the screen of the cover sheet creation mode. Thus, the preview image of the cover sheet is displayed on the display section.

FIG. 8D shows a screen displaying the header creation mode, which enables the user to confirm the settings of a header.

Referring to FIG. 8D, by pressing a button 2002, information to be used as header information can be selected out of candidates obtained by referring to the information registered in "my profile".

In a case where "my profile" is not used, by pressing a button 2001, the information which is manually input can also be used as the header. Further, by pressing a header setting button 2003, the user can select whether to use the fax number of the MFP, a header created by the mobile fax application, or a header to which the header information created by the mobile fax application is added.

As described above, the settings concerning the header of a fax document include the setting of whether or not to use information on the user who uses the mobile terminal, which has been registered in advance, the setting of whether or not to use the fax number of the image forming apparatus in the header, the setting of whether or not to use a header created by the mobile terminal as the header, and the setting of whether or not to add information created by the mobile terminal to the header.

When a button 2004 is pressed, the header is created, and when a button 2005 is pressed, header creation is canceled.

Figure 9:
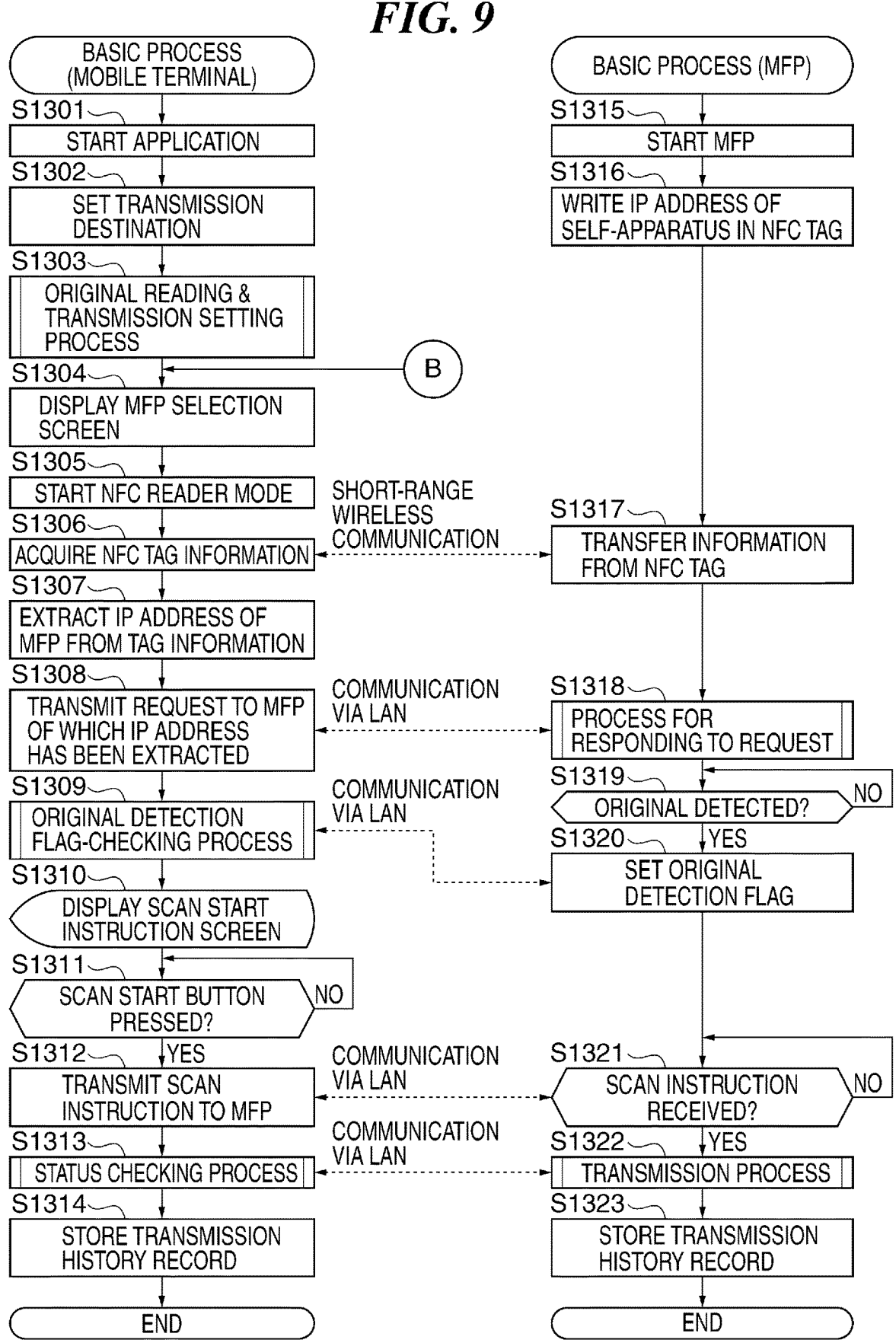
FIG. 9 is a flowchart of a basic process executed by the MFP and the mobile terminal.

FIG. 9 is a flowchart of a basic process executed by the MFP 101 and the mobile terminal 102.

Referring to FIG. 9, steps S1301 to S1314 are executed by the CPU 401 of the mobile terminal 102 according to programs stored in any of the ROM 403, the storage device 404, and the RAM 402 of the controller board 400 of the same shown in FIG. 3.

Further, steps S1315 to S1323 are executed by the CPU 301 of the MFP 101 according to programs stored in any of the ROM 303, the storage device 304, and the RAM 302 of the controller board 300 of the same shown in FIG. 2.

First, when the main power of the MFP 101 is switched on, the CPU 301 starts the MFP 101 according to a program stored in the ROM 303 of the controller board 300 (step S1315).

Next, the CPU 301 writes an IP address of the self-apparatus into the NFC tag 106 as a network address of the same (step S1316). More specifically, the CPU 301 stores the IP address of the self-apparatus e.g. in a non-volatile memory EEPROM provided in the NFC controller 313.

On the other hand, in the mobile terminal 102, the CPU 401 starts the mobile fax application so as to perform mobile facsimile transmission (step S1301).

The mobile fax application which has been started displays the setting screen shown in FIG. 5A. The user selects a transmission destination on this setting screen, whereby the transmission destination is set (step S1302), and then an original reading and transmission-setting process is performed (step S1303). The original reading and transmission-setting process will be described in detail hereinafter. The step S1302 corresponds to the operation of a transmission destination setting unit configured to set transmission destination information indicative of a transmission destination to which a fax document is to be transmitted.

When the next button 806 is pressed on the setting screen, the MFP selection screen shown in FIG. 5C is displayed (step S1304). A connector B appearing in FIG. 9 will be referred to hereinafter.

Then, the CPU 401 starts the NFC controller 413 of the mobile terminal 102 in a reader mode (step S1305).

To select the MFP 101 that scans an original and performs fax transmission, the user brings the mobile terminal 102 close to the NFC tag 106 of the MFP 101, whereby the mobile terminal 102 enters an NFC communicatable range.

By this operation, the MFP 101 transfers and provides an address for performing communication via the wireless LAN 104 and the network 105, which is different from short-range wireless communication (NFC) (step S1317), and the mobile terminal 102 acquires the information from the NFC tag 106 of the MFP 101 by the NFC controller 413 (step S1306). The step S1317 corresponds to the operation of an address providing unit.

Then, the CPU 401 of the mobile terminal 102 extracts the IP address of the MFP 101 from the information acquired by the NFC controller 413 (step S1307). The steps S1306 and S1307 corresponds to the operation of an address acquisition unit configured to acquire, when the mobile terminal is brought by the user close to a range communicatable with the image forming apparatus by short-range wireless communication, an address for performing communication, which is different from the short-range wireless communication, from the image forming apparatus by short-range wireless communication. Then, the mobile terminal 102 communicates with the image forming apparatus using the acquired address.

The mobile terminal 102 accesses the extracted IP address, and transmits a mobile fax request to the MFP 101 (step S1308). In doing this, if the MFP 101 is wiredly connected to the access point 103, the request is transmitted from the mobile terminal 102 to the MFP 101 via the wireless LAN interface 410, the access point 103, and the network 105. The step S1308 corresponds to the operation of a request transmission unit configured to transmit a request for transmitting the fax document, to the image forming apparatus.

On the other hand, if the MFP 101 is wirelessly connected, the request is transmitted from the mobile terminal 102 to the access point 103 via the wireless LAN interface 410, and wirelessly transmitted from the access point 103 having received the request to the MFP 101.

Upon receipt of the request, the MFP 101 executes a process for responding to the request, in which a response to the request is transmitted to the mobile terminal 102 (step S1318). The process for responding to the request will be described in detail hereinafter. Then, when an original is set on the ADF part or the platen part (YES to the step S1319), the MFP 101 sets an original detection flag (step S1320).

Upon receipt of the response to the request from the MFP 101, the mobile terminal 102 executes an original flag-checking process for checking whether or not the original detection flag has been set in the MFP 101 (step S1309). The original flag-checking process will be described in detail hereinafter.

When the original is set on the MFP 101, the CPU 401 displays the scan start instruction screen shown in FIG. 6B on the display section 406 of the mobile terminal 102 (step S1310). When the scan start button 1102 is pressed on this screen (YES to the step S1311), a scan instruction is transmitted to the MFP 101 (step S1312). The step S1312 corresponds to the operation of an instruction transmission unit configured to transmit, when it is detected that an original has been set on the image forming apparatus, and an instruction for transmitting a fax document (scan instruction) is received from the user, an instruction for reading the original and transmitting the fax document, together with transmission destination information and at least one of cover sheet data and header data, to the image forming apparatus.

Upon receipt of the scan instruction (YES to the step S1321), the MFP 101 scans the original, and executes a transmission process for performing fax transmission (step S1322). The transmission process will be described in detail hereinafter. After that, the MFP 101 stores a transmission history record according to a result of the transmission process (step S1323), followed by terminating the present process.

On the other hand, the mobile terminal 102 having transmitted the scan instruction to the MFP 101 executes a status checking process for checking whether the MFP 101 has transmitted the fax document or has terminated fax transmission with an error (step S1313). The status checking process will be described in detail hereinafter.

The mobile terminal 102 stores a transmission history record according to a result of the status checking process (step S1314), followed by terminating the present process.

Figure 10:
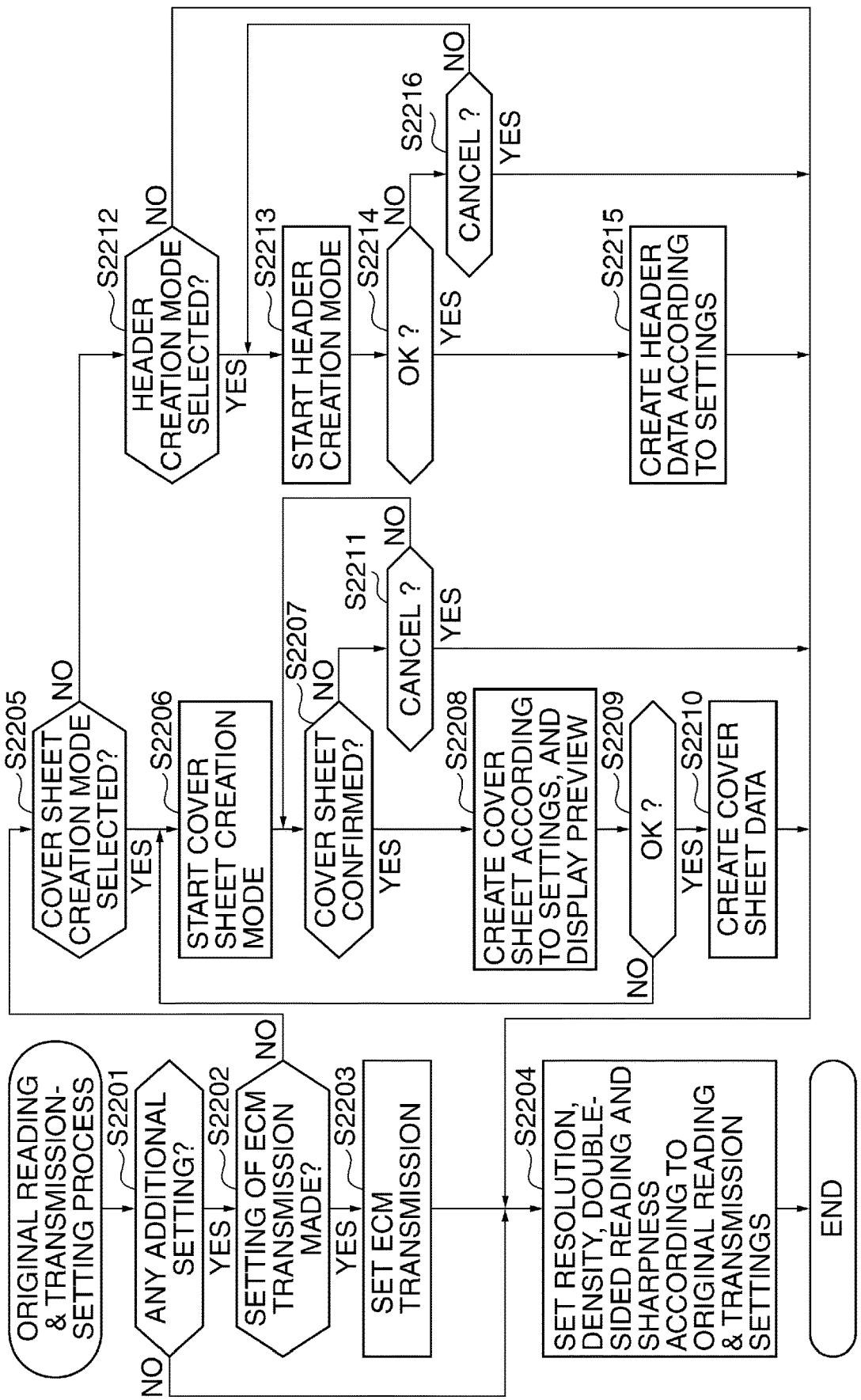
FIG. 10 is a flowchart of an original reading and transmission-setting process executed in a step in FIG. 9.

FIG. 10 is a flowchart of the original reading and transmission-setting process executed in the step S1303 in FIG. 9.

Referring to FIG. 10, the CPU 401 determines whether or not any additional setting which can be set by the additional setting button 808 appearing in FIG. 5A has been set (step S2201). If it is determined in the step S2201 that no additional setting has been set (NO to the step S2201), the CPU 401 proceeds to a step S2204.

On the other hand, if it is determined in the step S2201 that any additional setting has been set (YES to the step S2201), the CPU 401 determines whether or not ECM transmission has been set (step S2202).

If it is determined in the step S2202 that ECM transmission has been set (YES to the step S2202), the CPU 401 makes a setting for using ECM transmission (step S2203), and the CPU 401 proceeds to the step S2204.

If it is determined in the step S2202 that ECM transmission has not been set (NO to the step S2202), the CPU 401 determines whether or not the cover sheet creation mode has been selected (step S2205).

If it is determined in the step S2205 that the cover sheet creation mode has been selected (YES to the step S2205), the CPU 401 displays the screen shown in FIG. 7B, and starts the cover sheet creation mode (S2206).

When the items which can be set in the cover sheet creation mode are set, and the button 1408 is pressed (YES to a step S2207), the CPU 401 creates a cover sheet according to the settings, and displays a preview examples of which are shown in FIGS. 8A, 8B, and 8C (step S2208).

Then, the CPU 401 determines whether or not the button 2104 has been pressed on the screen the examples of which are shown in FIGS. 8A, 8B, and 8C (step S2209), and if the button 2105 for canceling cover sheet creation has been pressed (NO to the step S2209), the CPU 401 returns to the step S2006.

On the other hand, if the button 2104 has been pressed (YES to the step S2209), cover sheet data is created (step S2210), and the CPU 401 proceeds to the step S2204. The step S2210 corresponds to the operation of a cover sheet creation unit configured to create, according to settings of a cover sheet of the fax document, cover sheet data representative of the cover sheet.

Further, if it is determined in the step S2207 that the button 1409 for canceling sheet cover creation has been pressed (NO to the step S2207, and YES to a step S2211), the CPU 401 proceeds to the step S2204.

Referring again to the step S2205, if it is determined in the step S2205 that the header creation mode has been selected (NO to the step S2205, and YES to a step S2212), the CPU 401 displays the screen an example of which is shown in FIG. 8D, and starts the header creation mode (step S2213).

When the items which can be set in the header creation mode are set, and the button 2004 is pressed (YES to a step S2214), the CPU 401 creates the header data according to the settings (step S2215), and proceeds to the step S2204. The step S2215 corresponds to the operation of a header creation unit configured to create, according to settings of a header of the fax document, header data representative of the header.

If the button 2005 for canceling header creation is pressed during the header creation mode (NO to the step S2214, and YES to a step S2216), header creation is canceled, and the CPU 401 proceeds to the step S2204.

Also, if it is determined in the step S2212 that the header creation mode has not been selected (NO to the step S2212), the CPU 401 proceeds to the step S2204.

Then, the resolution, density, double-sided reading, and sharpness are set according to the settings thereof (step S2204), followed by terminating the present process.

The resolution in this example indicates a reading resolution, and is set by selecting a value from alternatives including 200×200 dpi (fine). The density can be set by adjusting a reading density in a stepwise manner. For the double-sided reading, double-sided reading of an original can be set to on or off, and a page layout to be read can be set to a horizontally or vertically opening type. For the sharpness, the degree of sharpness of edges and degree of contrast of an original image can be adjusted in a stepwise manner. The user can set these items according to characteristics of an original and the user's taste.

Figure 11:
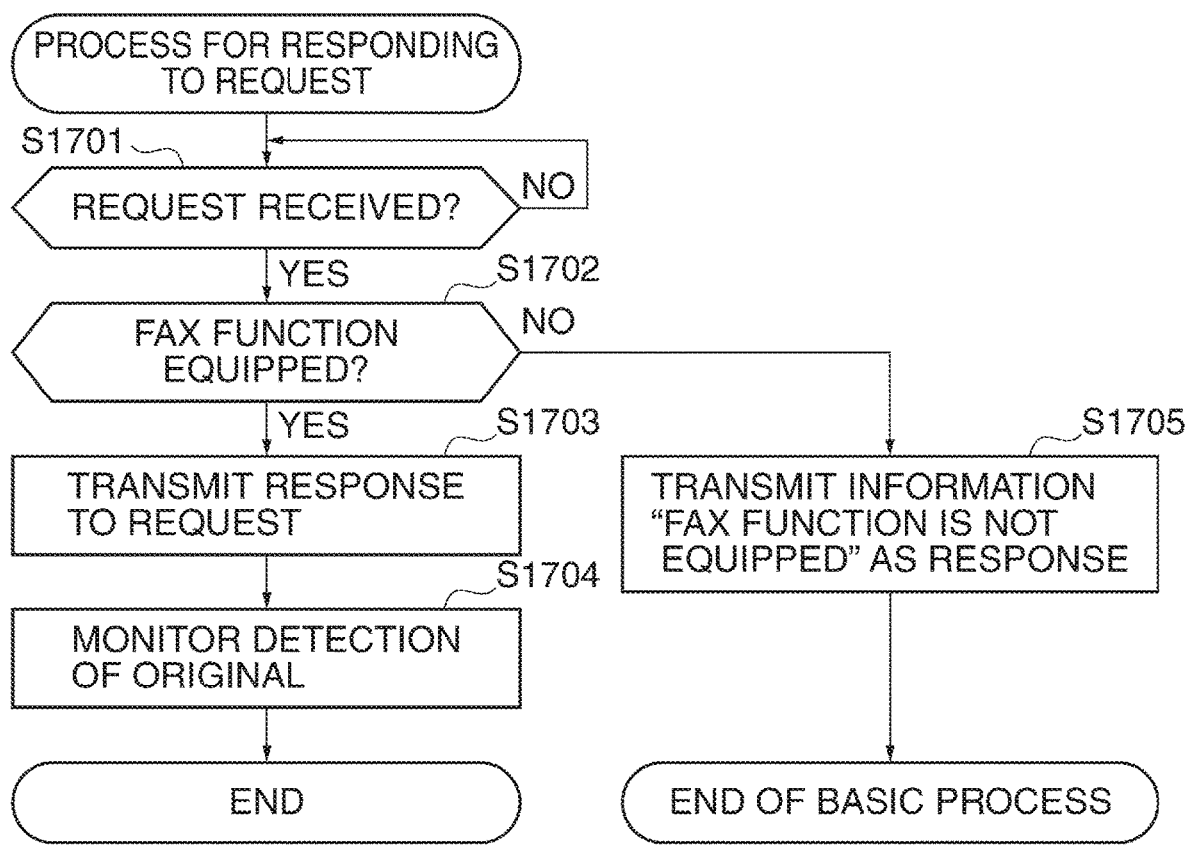
FIG. 11 is a flowchart of a process for responding to a request, which is executed in a step in FIG. 9.

FIG. 11 is a flowchart of the process for responding to a request, which is executed in the step S1318 in FIG. 9.

Referring to FIG. 11, upon receipt of a request (YES to a step S1701), the MFP 101 determines whether or not the self-apparatus is equipped with the fax function (step S1702). The step S1701 corresponds to the operation of a request reception unit configured to receive a request for transmitting a fax document, from the mobile terminal.

If it is determined in the step S1702 that the MFP 101 is equipped with the fax function (YES to the step S1702), the CPU 301 transmits a response to the received request (step S1703). After transmitting the response, the CPU 301 starts monitoring whether or not an original is set, by the original detection sensor 320 (step S1704), followed by terminating the present process.

On the other hand, if it is determined in the step S1702 that the MFP 101 is not equipped with the fax function (NO to the step S1702), the CPU 301 transmits information indicative of absence of the mobile fax function to the mobile terminal 102 as a response (step S1705), followed by terminating the basic process shown in FIG. 9.

In the step S1703 of the above-described process for responding to a request, information on capabilities of the MFP 101 concerning fax transmission may be transmitted in combination with the response to the request, instead of merely making a response that the MFP 101 supports the mobile fax request.

More specifically, the CPU 301 transmits information on the fax transmission function which can be set to the self-apparatus, such as whether or not ECM transmission is set, alternatives of resolution, whether or not the ADF double-sided reading can be executed, to the mobile terminal 102, as a response.

Further, the mobile terminal 102 having received the information on the fax transmission function of the MFP 101 compares the settings selected by the user in advance with the settings which can be set, received from the MFP 101.

If an item which cannot be set to the MFP 101 has been set by the mobile terminal 102, the CPU 401 displays a message which requests the user to change the setting. Alternatively, the item may be automatically changed to a setting closest to the setting set by the user.

This makes it possible to cope with a case where the MFP 101 that is to actually transmit a fax document cannot be set to the settings made by the user on the mobile terminal 102 in advance.

Figure 12:
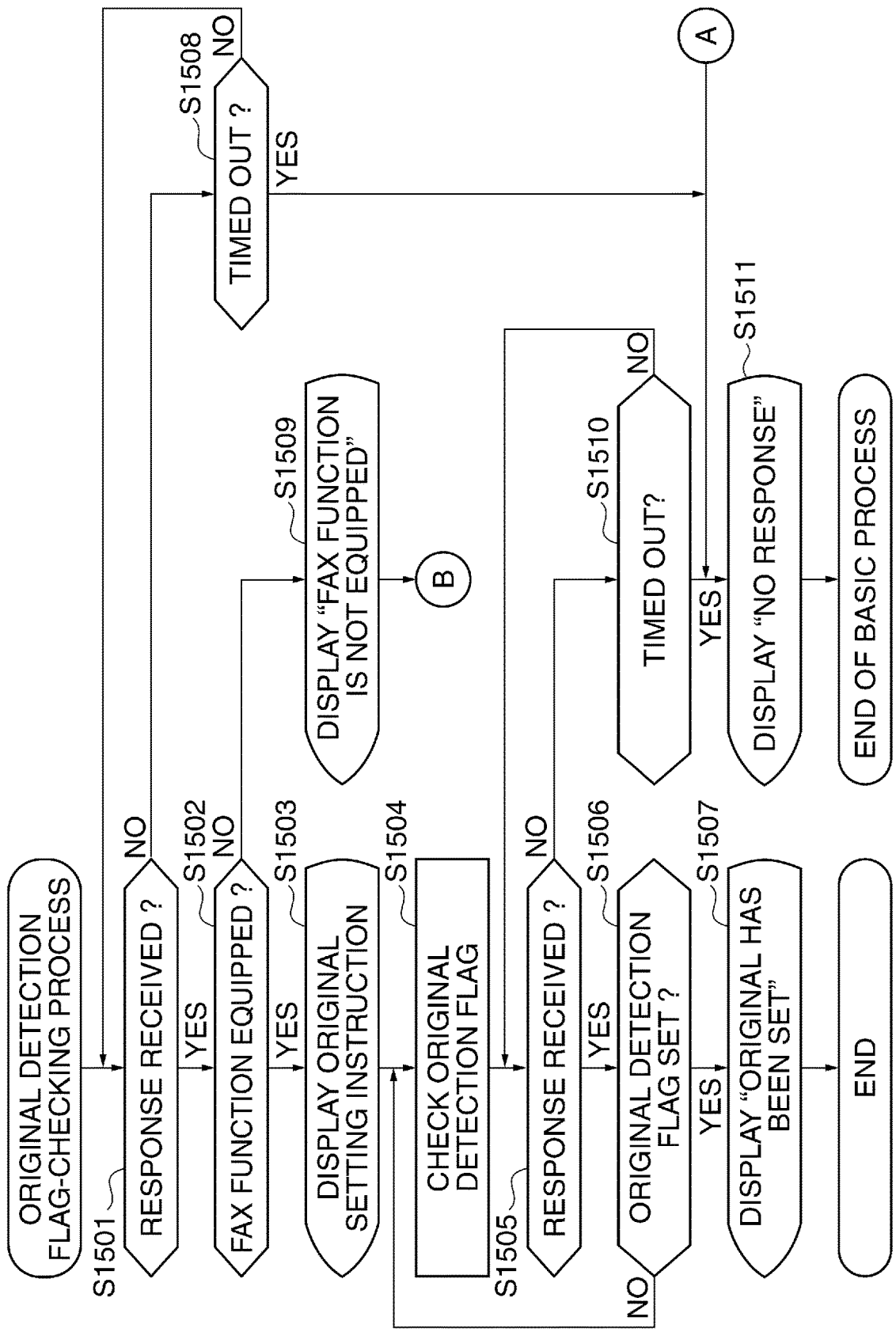
FIG. 12 is a flowchart of an original detection flag-checking process executed in a step in FIG. 9.

FIG. 12 is a flowchart of the original detection flag-checking process executed in the step S1309 in FIG. 9.

Referring to FIG. 12, the CPU 401 determines whether or not a response to the request has been received from the MFP 101 (step S1501). If it is determined in the step S1501 that a response to the request has been received from the MFP 101 (YES to the step S1501), the CPU 401 determines whether or not the MFP 101 is equipped with the fax function (step S1502).

If it is determined in the step S1502 that the MFP 101 is not equipped with the fax function (NO to the step S1502), the CPU 401 displays a message on the display section 406 of the mobile terminal 102 to the effect that the selected MFP is not equipped with the fax function (step S1509), and the CPU 401 proceeds to the step S1304 in FIG. 9 as indicated by the connector B.

On the other hand, if it is determined in the step S1502 that the MFP 101 is equipped with the fax function (YES to the step S1502), the CPU 401 displays a message shown in FIG. 6A on the display section 406 of the mobile terminal 102 for prompting the user to set an original on the MFP 101 (step S1503). The step S1503 corresponds to the operation of an original setting instruction-displaying unit configured to display a message for prompting a user to set an original on the image forming apparatus when a response notifying that the image forming apparatus is capable of transmitting a fax document is received from the image forming apparatus to which the request has been transmitted.

Next, to check the original detection flag, the CPU 401 performs polling for transmitting a query about the original detection flag to the MFP 101 at regular time intervals (step S1504). Then, the CPU 401 determines whether or not a response to the polling has been received (step S1505).

If it is determined in the step S1505 that a response has been received (YES to the step S1505), the CPU 401 determines whether or not the original detection flag has been set (step S1506).

If it is determined in the step S1506 that the original detection flag has not been set (NO to the step S1506), the CPU 401 returns to the step S1504.

On the other hand, if it is determined in the step S1506 that the original detection flag has been set (YES to the step S1506), the CPU 401 displays a message shown in FIG. 6B on the display section 406 of the mobile terminal 102 to the effect that an original has been set (step S1507), followed by terminating the present process.

Referring again to the step S1505, if it is determined in the step S1505 that a response has not been received (NO to the step S1505), the CPU 401 determines whether or not the polling has timed out (step S1510). If it is determined in the step S1510 that the polling has not timed out (NO to the step S1510), the CPU 401 returns to the step S1505.

On the other hand, if it is determined in the step S1510 that the polling has timed out (YES to the step S1510), the CPU 401 displays a message to the effect that a response has not been received from the MFP 101 (step S1511), followed by terminating the basic process shown in FIG. 9.

Referring again to the step S1501, if it is determined in the step S1501 that a response has not been received (NO to the step S1501), the CPU 401 determines whether or not the request has timed out (step S1508). If it is determined in the step S1508 that the request has not timed out (NO to the step S1508), the CPU 401 returns to the step S1501.

On the other hand, if it is determined in the step S1508 that the request has timed out (YES to the step S1508), the CPU 401 proceeds to the step S1511.

Figure 13:
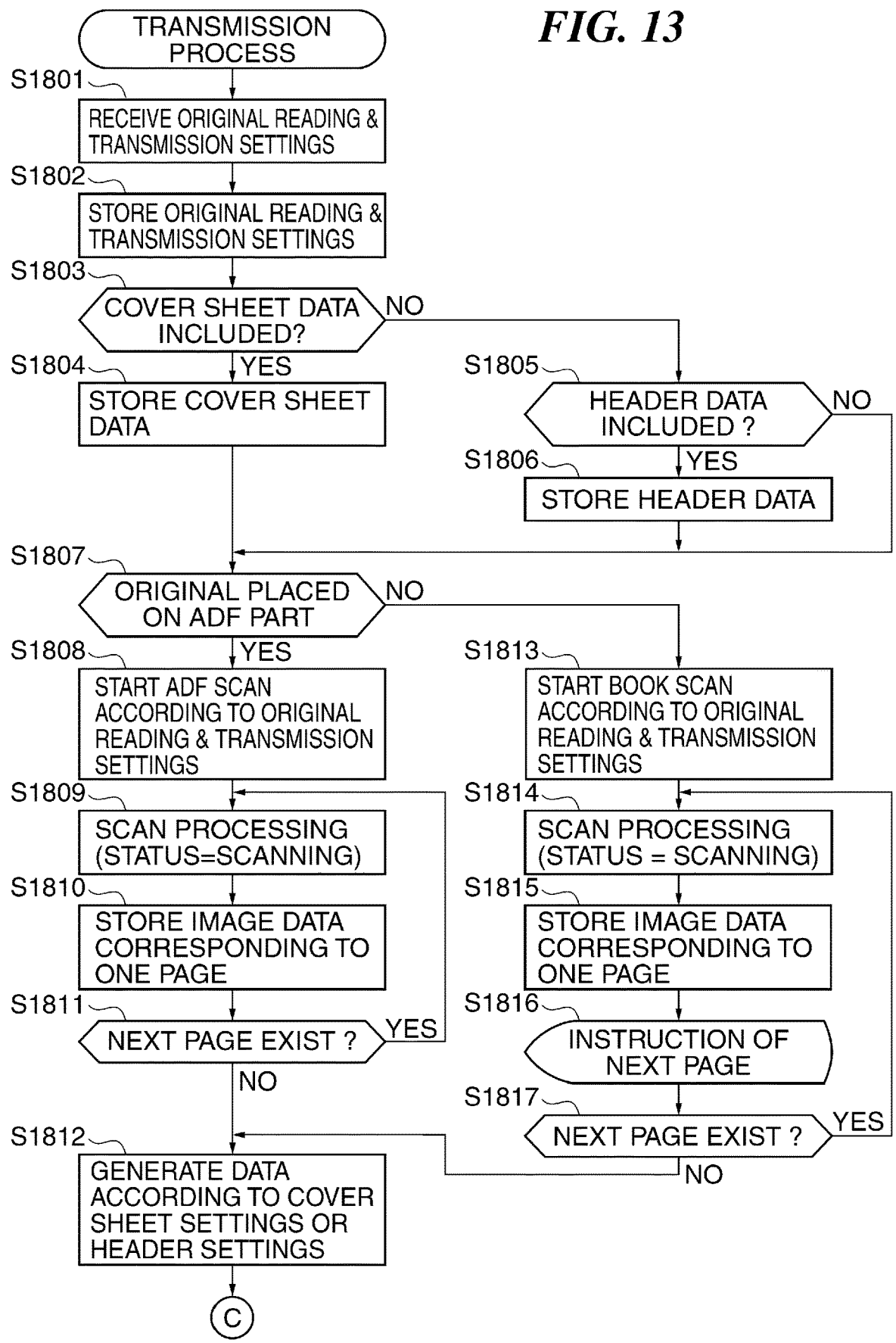
FIG. 13 is a flowchart of a transmission process executed in a step in FIG. 9.
Figure 14:
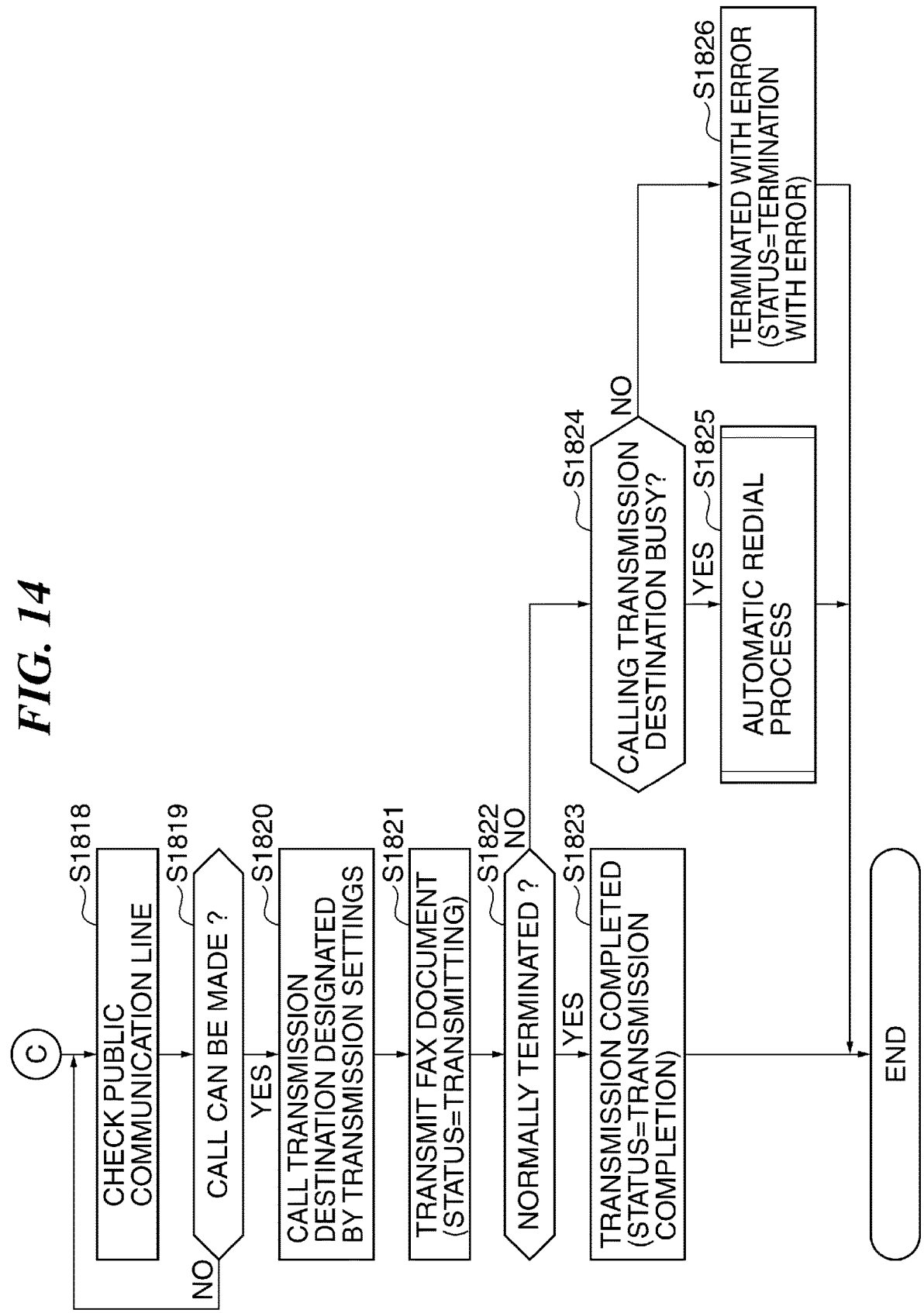
FIG. 14 is a continuation of FIG. 13.

FIGS. 13 and 14 are a flowchart of the transmission process executed in the step S1322 in FIG. 9.

Referring to FIG. 13, the MFP 101 receives document reading and transmission settings including the settings of a transmission destination, a transmission source, document reading (scanning), etc. (step S1801), and stores the received settings (step S1802).

Then, the CPU 301 of the MFP 101 determines whether or not the received information includes cover sheet data (step S1803). If it is determined in the step S1803 that the received information includes cover sheet data (YES to the step S1803), the CPU 301 stores the cover sheet data (step S1804), and proceeds to a step S1807.

On the other hand, if it is determined in the step S1803 that cover sheet data is not included (NO to the step S1803), the CPU 301 determines whether or not the received information includes header data (step S1805). If it is determined in the step S1805 that header data is included (YES to the step S1805), the CPU 301 stores the header data (step S1806), and proceeds to the step S1807.

On the other hand, if it is determined in the step S1805 that header data is not included (NO to the step S1805), the CPU 301 directly proceeds to the step S1807. The steps S1801, S1803, and S1804 correspond to the operations of an instruction reception unit configured to receive from the mobile terminal an instruction for reading an original and transmitting the fax document, together with transmission destination information indicative of a transmission destination to which the fax document is to be transmitted, and at least one of cover sheet data and header data of the fax document.

Then, the CPU 301 determines whether or not an original has been set on the ADF part (step S1807). If it is determined in the step S1807 that an original has been set on the ADF part (YES to the step S1807), the CPU 301 starts ADF scan (scan from the ADF part) according to the original reading and transmission settings (step S1808).

Then, the CPU 301 executes scan processing (step S1809), and stores the scanned image data corresponding to one page (step S1810). The status of the MFP 101 in the step S1805 is "scanning".

Then, the CPU 301 determines whether or not there is a next page (step S1811). If it is determined in the step S1811 that there is a next page (YES to the step S1811), the CPU 301 returns to the step S1809.

On the other hand, if it is determined in the step S1811 that there is no next page (NO to the step S1811), the CPU 301 creates image data according to the cover sheet data or the header data, if any (step S1812), and proceeds to FIG. 14 to check the public communication line (step S1818).

Then, the CPU 301 determines whether or not a call can be made (step S1819). If it is determined in the step S1819 that a call cannot be made (NO to the step S1819), the CPU 301 returns to the step S1818.

On the other hand, if it is determined in the step S1819 that a call can be made (YES to the step S1819), the CPU 301 calls the transmission destination designated by the setting of a transmission destination (step S1820), and performs fax transmission (step S1821). The status of the MFP 101 in the step S1811 is "transmitting".

Then, the CPU 301 determines whether or not fax transmission has been normally terminated (step S1822). If it is determined in the step S1822 that fax transmission has been normally terminated (YES to the step S1822), the CPU 301 determines that the transmission is completed (step S1823), followed by terminating the present process. As the status of the MFP 101 in the step S1823, "transmission completion" is set.

On the other hand, if it is determined in the step S1822 that fax transmission has not been normally terminated (NO to the step S1822), the CPU 301 determines whether or not the telephone number of the calling transmission destination is busy (step S1824). If it is determined in the step S1824 that the telephone number of the calling transmission destination is busy (YES to the step S1824), the CPU 301 executes an automatic redial process for calling the number again (step S1825), followed by terminating the present process.

On the other hand, if it is determined in the step S1824 that the telephone number of the calling transmission destination is not busy (NO to the step S1824), the CPU 301 terminates fax transmission as an error (step S1826), followed by terminating the present process. As the status of the MFP 101 in the step S1826, "termination with error" is set. The steps S1823 and S1826 correspond to the operations of a status setting unit configured to set a status indicative of a result of transmission of the fax document.

Referring again to the step S1807 in FIG. 13, if it is determined in the step S1807 that an original has not been placed on the ADF part (NO to the step S1807), the CPU 301 starts book scan (scan from the platen part) according to the original reading and transmission settings (step S1813). The CPU 301 executes scan processing (step S1814), and stores the scanned image data corresponding to one page (step S1815). The steps S1809, S1814, and S1821 correspond to the operations of a fax document transmission unit configured to read the original, and transmit the fax document representative of the original to a transmission destination indicated by the transmission destination information, together with data generated based on at least one the cover sheet data and the header data, according to an instruction for transmitting the fax document.

When the scanned image data corresponding to one page has been stored, the CPU 301 displays an instruction for reading the next original (step S1816), and determines whether or not there is a next page (step S1817).

If it is determined in the step S1817 that there is a next page (YES to the step S1817), the CPU 301 returns to the step S1814.

If it is determined in the step S1817 that there is no next page (NO to the step S1817), the CPU 301 proceeds to the step S1818 to create image data according to the cover sheet data or the header data, if any, and then proceeds to the step S1818.

Figure 15:
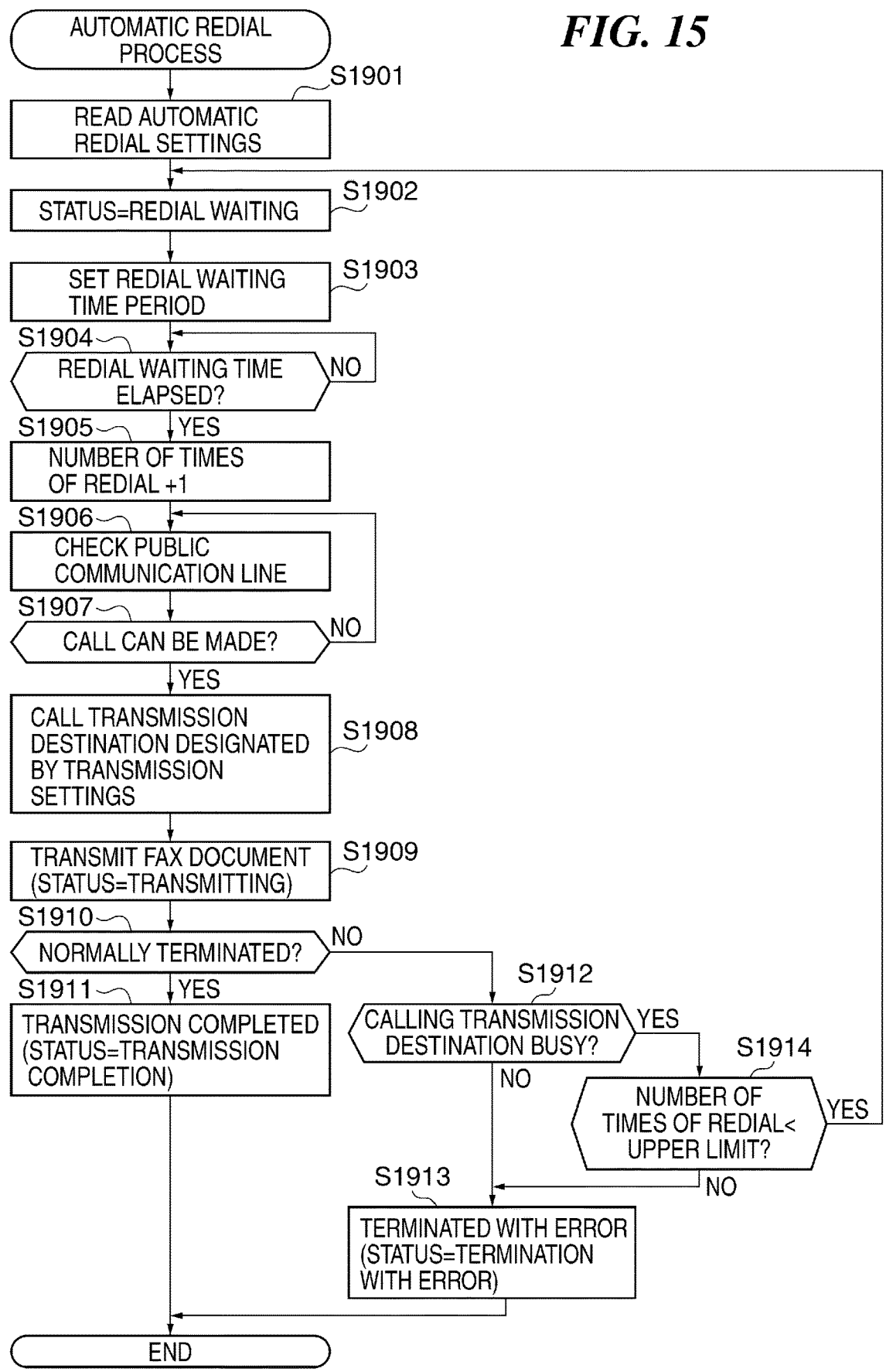
FIG. 15 is a flowchart of an automatic redial process executed in a step in FIG. 14.

FIG. 15 is a flowchart of the automatic redial process executed in the step S1825 in FIG. 14.

Referring to FIG. 15, the CPU 301 of the MFP 101 reads settings of the automatic redial set in advance (step S1901), sets the status of the MFP 101 to "redial waiting" (step S1902), and sets a redial waiting time period (step S1903).

When the redial waiting time period has elapsed (YES to a step S1904), the CPU 301 increments the number of times of redialing by one (step S1905), and checks the public communication line (step S1906).

Then, the CPU 301 determines whether or not a call can be made (step S1907). If it is determined in the step S1907 that a call cannot be made (NO to the step S1907), the CPU 301 returns to the step S1906.

On the other hand, if it is determined in the step S1907 that a call can be made (YES to the step S1907), the CPU 101 calls the transmission destination designated by the setting of a transmission destination (step S1908), and performs fax transmission (step S1909). The status of the MFP 101 in the step S1909 is "transmitting".

Then, the CPU 301 determines whether or not fax transmission has been normally terminated (step S1910). If it is determined in the step S1910 that fax transmission has been normally terminated (YES to the step S1910), the CPU 301 determines that the transmission is completed (step S1911), followed by terminating the present process. The status of the MFP 101 in the step S1911 is "transmission completion".

On the other hand, if it is determined in the step S1910 that fax transmission has not been normally terminated (NO to the step S1910), the CPU 301 determines whether or not the telephone number of the calling transmission destination is busy (step S1912).

If it is determined in the step S1912 that the telephone number of the calling transmission destination is not busy (NO to the step S1912), the CPU 301 terminates fax transmission as an error (step S1913), followed by terminating the present process. The status of the MFP 101 in the step S1913 is "termination with error".

On the other hand, if it is determined in the step S1912 that the telephone number of the calling transmission destination is busy (YES to the step S1912), the CPU 301 determines whether or not the number of times of redialing is less than a upper limit number (step S1914).

If it is determined in the step S1914 that the number of times of redialing is less than the upper limit number (YES to the step S1914), the CPU 301 returns to the step S1902.

On the other hand, if it is determined in the step S1914 that the number of times of redialing is not less than the upper limit number (NO to the step S1914), the CPU 301 proceeds to the step S1913.

Figure 16:
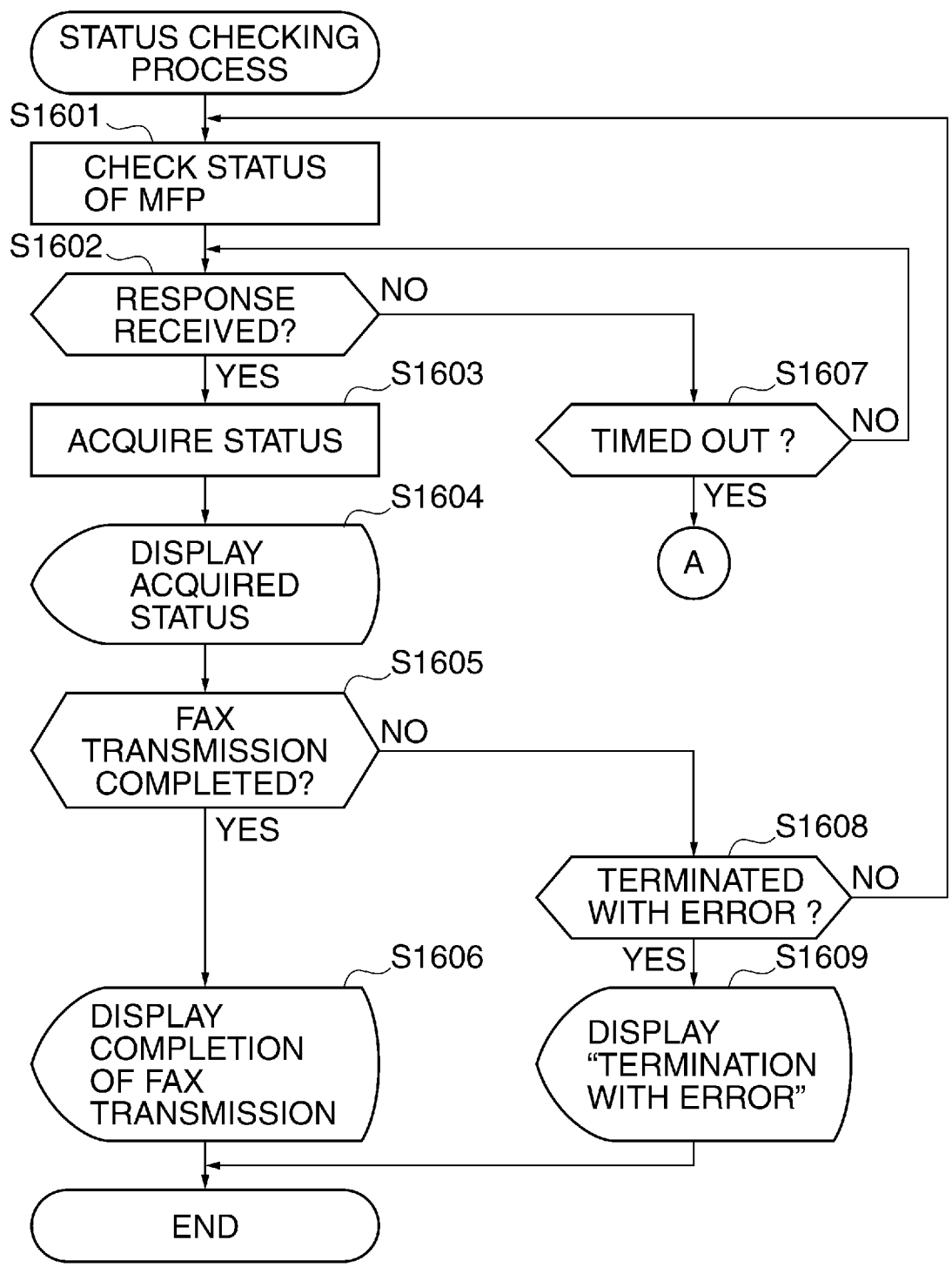
FIG. 16 is a flowchart of a status checking process executed in a step in FIG. 9.

FIG. 16 is a flowchart of the status checking process executed in the step S1313 in FIG. 9.

Referring to FIG. 16, the CPU 401 of the mobile terminal 102 checks the status of the MFP 101 (step S1601), and determines whether or not a response has been received (step S1602).

If it is determined in the step S1602 that no response has been received (NO to the step S1602), the CPU 401 determines whether or not the request has timed out (step S1607). If it is determined in the step S1607 that the request has not timed out (NO to the step S1607), the CPU 401 returns to the step S1602.

On the other hand, if it is determined in the step S1607 that the request has timed out (YES to the step S1607), as indicated by a connector A, the CPU 401 proceeds to the step S1511 in FIG. 12.

Referring again to the step S1602, if it is determined in the step S1602 that a response has been received (YES to the step S1602), the CPU 401 acquires the status of the MFP 101 from the received response (step S1603).

Next, the CPU 401 displays the acquired status of the MFP 101 on the display section 406 of the mobile terminal 102 (step S1604). More specifically, the CPU 401 displays the status, such as "dialing", "transmitting" or the like.

Then, the CPU 401 determines whether or not fax transmission is completed (step S1605). If it is determined in the step S1605 that fax transmission is completed (YES to the step S1605), the CPU 401 displays a message on the display section 406 of the mobile terminal 102 to the effect that the fax document has been transmitted (step S1606), followed by terminating the present process.

On the other hand, if it is determined in the step S1605 that fax transmission has not been completed (NO to the step S1605), the CPU 401 determines whether or not fax transmission has been terminated with an error (step S1608). If it is determined in the step S1608 that fax transmission has not been terminated with an error (NO to the step S1608), the CPU 401 returns to the step S1601.

On the other hand, if it is determined in the step S1608 that fax transmission has been terminated with an error (YES to the step S1608), the CPU 401 displays a message that fax transmission has been terminated with an error on the display section 406 of the mobile terminal 102 (step S1609), followed by terminating the present process. The steps S1606 and S1609 correspond to the operations of a transmission result-displaying unit configured to display a result of transmission of the fax document by the image forming apparatus, on the display section 406.

As described above, in the status checking process, the transmission result is displayed according to a status indicative of a transmission result acquired from the image forming apparatus. Further, if the answer to the question of the step S1607 is negative (NO), i.e. if the status cannot be acquired, the CPU 401 proceeds to the step S1511 in FIG. 12 as indicated by the connector A, to display a message to the effect that a response from the image forming apparatus cannot be obtained.

According to the present embodiment, it is also possible to create header information using the profile information of the telephone directory registered in the mobile terminal, and hence it is possible to transmit a fax document by adding thereto not only the device information of the MFP 101 but also user information.

Further, also when a cover sheet is created and attached to a fax document, the profile information of the telephone directory registered in the mobile terminal is used, and hence it is possible to easily input user information without making a mistake.

As described above, according to the present embodiment, cover sheet data representative of a cover sheet is created according to the settings of a cover sheet of a fax document (step S2210), and header data representative of a header is created according to the settings of a header of the fax document (step S2215). When an instruction for transmitting the fax document is received from the user, an instruction for reading an original and transmitting the fax document is transmitted to the image forming apparatus, together with transmission destination information and at least one of the cover sheet data and the header data (step S1312), and hence it is possible to cause the image forming apparatus to transmit the fax document with the cover sheet or the header set by the mobile terminal.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-128530 filed Jun. 19, 2013, which is hereby incorporated by reference herein in its entirety.

What is claimed is:

1. A method for controlling a mobile terminal, the method comprising:

receiving, before receiving connection information from a document scanning apparatus, selection of a destination from an address book stored in the mobile terminal by a user;

by the mobile terminal entering into a certain range where the mobile terminal is communicable via short range wireless communication with the document scanning apparatus, receiving from the document scanning apparatus, via the short range wireless communication, the connection information to be used for transmitting the selected destination to the document scanning apparatus via wireless communication that has a longer range than the short range wireless communication; and transmitting, via the wireless communication using the received connection information, the selected destination to the document scanning apparatus, whereby the document scanning apparatus transmits the image data generated by scanning a document to the selected destination.

2. The method according to claim 1,
wherein the mobile terminal is entered into the certain range for selecting the document scanning apparatus as a document scanning apparatus to which the selected destination is transmitted.

3. The method according to claim 1, further comprising receiving, via the wireless communication that has the longer range than the short range wireless communication after transmitting the selected destination to the document scanning apparatus, information indicating a status of transmission, by the document scanning apparatus, of the image data generated by scanning the document to the selected destination.

4. The method according to claim 3,
wherein the information indicating the status is information indicating completion of the transmission of the image data generated by scanning the document to the selected destination.

5. The method according to claim 3,
wherein the information indicating the status is information indicating that an error occurs on the transmission of the image data generated by scanning the document to the selected destination.

6. The method according to claim 3,
wherein a user interface of the mobile terminal displays a message based on the information indicating the status.

7. The method according to claim 1,
wherein the connection information is an IP address of the document scanning apparatus.

8. The method according to claim 1,
wherein a communication method of the short range wireless communication is different from a communication method of the wireless communication that has the longer range than the short range wireless communication.

9. The method according to claim 8,
wherein the communication method of the short range wireless communication is NFC,
wherein the communication method of the wireless communication that has the longer range than the short range wireless communication is wireless LAN communication.

10. The method according to claim 1,
wherein, by the mobile terminal being touched to the document scanning apparatus, the connection information to be used for transmitting the selected destination to the document scanning apparatus via wireless communication that has a longer range than the short range wireless communication is received from the document scanning apparatus.

11. The method according to claim 1,
wherein the document scanning apparatus, after receiving the selected destination from the mobile terminal, scans the document and transmits the image data generated by scanning the document to the selected destination.

12. A mobile terminal comprising:
a user interface that receives, before receiving connection information from a document scanning apparatus, selection of a destination from an address book stored in the mobile terminal by a user;

a first communicator that, by the mobile terminal entering into a certain range where the mobile terminal is communicable via short range wireless communication with the document scanning apparatus, receives from the document scanning apparatus, via the short range wireless communication, the connection information to be used for transmitting the selected destination to the document scanning apparatus via wireless communication that has a longer range than the short range wireless communication; and a second communicator that transmits, via the wireless communication using the received connection information, the selected destination to the document scanning apparatus, wherein the document scanning apparatus transmits the image data generated by scanning a document to the selected destination.

13. A non-transitory computer readable medium storing a program casing a mobile terminal to execute a method, the method comprising:
receiving, before receiving connection information from a document scanning apparatus, selection of a destination from an address book stored in the mobile terminal by a user;

by the mobile terminal entering into a certain range where the mobile terminal is communicable via short range wireless communication with the document scanning apparatus, receiving from the document scanning apparatus, via the short range wireless communication, the connection information to be used for transmitting the selected destination to the document scanning apparatus via wireless communication that has a longer range than the short range wireless communication; and transmitting, via the wireless communication using the received connection information, the selected destination to the document scanning apparatus, wherein the document scanning apparatus transmits the image data generated by scanning a document to the selected destination.

14. The non-transitory computer readable medium according to claim 13,
wherein the mobile terminal is entered into the certain range for selecting the document scanning apparatus as a document scanning apparatus to which the selected destination is transmitted.

15. The non-transitory computer readable medium according to claim 13, further comprising
receiving, via the wireless communication that has the longer range than the short range wireless communication after transmitting the selected destination to the document scanning apparatus, information indicating a status of transmission, by the document scanning apparatus, of the image data generated by scanning the document to the selected destination.

16. The non-transitory computer readable medium according to claim 15,
   wherein the information indicating the status is information indicating completion of the transmission of the image data generated by scanning the document to the selected destination.

17. The non-transitory computer readable medium according to claim 15,
   wherein the information indicating the status is information indicating that an error occurs on the transmission of the image data generated by scanning the document to the selected destination.

18. The non-transitory computer readable medium according to claim 15,
   wherein a user interface of the mobile terminal displays a message based on the information indicating the status.

19. The non-transitory computer readable medium according to claim 13,
   wherein the connection information is an IP address of the document scanning apparatus.

20. The non-transitory computer readable medium according to claim 13,
   wherein a communication method of the short range wireless communication is different from a communication method of the wireless communication that has the longer range than the short range wireless communication.

21. The non-transitory computer readable medium according to claim 20,
   wherein the communication method of the short range wireless communication is NFC,
   wherein the communication method of the wireless communication that has the longer range than the short range wireless communication is wireless LAN communication.

22. The non-transitory computer readable medium according to claim 13,
   wherein, by the mobile terminal being touched to the document scanning apparatus, the connection information to be used for transmitting the selected destination to the document scanning apparatus via wireless communication that has a longer range than the short range wireless communication is received from the document scanning apparatus.

23. The non-transitory computer readable medium according to claim 13,
   wherein the document scanning apparatus, after receiving the selected destination from the mobile terminal, scans the document and transmits the image data generated by scanning the document to the selected destination.

* * * * *